(12) United States Patent
Mishra

(10) Patent No.: US 12,254,880 B2
(45) Date of Patent: Mar. 18, 2025

(54) TARGETED GENERATIVE AI FROM MERGED COMMUNICATION TRANSCRIPTS

(71) Applicant: LIVEPERSON, INC., New York, NY (US)

(72) Inventor: Amit Mishra, Broomfield, CO (US)

(73) Assignee: LIVEPERSON, INC., New York, NY (US)

( * ) Notice: Subject to any disclaimer, the term of this patent is extended or adjusted under 35 U.S.C. 154(b) by 0 days.

(21) Appl. No.: 18/208,367

(22) Filed: Jun. 12, 2023

(65) Prior Publication Data

US 2023/0410801 A1  Dec. 21, 2023

Related U.S. Application Data

(60) Provisional application No. 63/351,939, filed on Jun. 14, 2022.

(51) Int. Cl.
*G10L 15/22* (2006.01)
*G06F 9/451* (2018.01)
(Continued)

(52) U.S. Cl.
CPC ............ *G10L 15/22* (2013.01); *G10L 15/063* (2013.01); *G10L 15/18* (2013.01); *G10L 15/30* (2013.01);
(Continued)

(58) Field of Classification Search
CPC ....... G10L 15/22; G10L 15/063; G10L 15/18; G10L 15/30; G10L 2015/0635;
(Continued)

(56) References Cited

U.S. PATENT DOCUMENTS 10,528,671 B1 * 1/2020 Robertson ............... G06F 40/30
11,743,378 B1 * 8/2023 Johnston ............. H04M 3/5315
704/270.1

(Continued)

OTHER PUBLICATIONS

International Search Report and Written Opinion of Oct. 26, 2023 for PCT Application No. PCT/US2023/025017, 11 pages.

*Primary Examiner* — Michael Colucci
(74) *Attorney, Agent, or Firm* — POLSINELLI LLP

(57) ABSTRACT

The present disclosure relates generally to systems, methods, instructions, and other aspects describing automated transcription and associated script generation. In one aspect, a method includes facilitating a voice bot segment of a two-way communication session, where the voice bot segment is between a customer device and a non-human bot agent, and transfer of the session to a human agent device as part of a human voice segment of the two-way communication session, wherein the transfer occurs following a failure of the non-human bot agent to resolve a customer issue. Accessing survey data describing the two-way communication session, wherein the survey data is associated with successful resolution of the customer issue and automatically processing transcript data from the two-way communication with the survey data to identify language data from the transcript associated with resolution of the customer issue. The non-human bot agent is then dynamically updated using the language data.

24 Claims, 24 Drawing Sheets

(51) Int. Cl.
*G10L 15/06* (2013.01)
*G10L 15/18* (2013.01)
*G10L 15/30* (2013.01)
*H04M 3/42* (2006.01)
*H04M 3/51* (2006.01)
*H04M 3/58* (2006.01)

(52) U.S. Cl.
CPC ..... *H04M 3/42221* (2013.01); *H04M 3/5166* (2013.01); *H04M 3/5175* (2013.01); *H04M 3/58* (2013.01); *G06F 9/451* (2018.02); *G10L 2015/0635* (2013.01); *H04M 2201/405* (2013.01); *H04M 2242/08* (2013.01)

(58) Field of Classification Search
CPC ........... H04M 3/42221; H04M 3/5166; H04M 3/5175; H04M 3/58; H04M 2201/405; H04M 2242/08; G06F 9/451
See application file for complete search history.

(56) References Cited

U.S. PATENT DOCUMENTS

| | | |
|---|---|---|
| 2010/0332287 A1* | 12/2010 | Gates .................. G06Q 30/02 379/265.09 |
| 2018/0165691 A1 | 6/2018 | Dolan et al. |
| 2020/0099633 A1* | 3/2020 | D'Agostino .......... G06F 3/0481 |
| 2020/0137230 A1* | 4/2020 | Spohrer .............. H04M 7/0027 |
| 2020/0349614 A1* | 11/2020 | Batcha ................ H04M 3/5141 |
| 2021/0125190 A1* | 4/2021 | Coman ................ G06Q 30/016 |
| 2021/0142789 A1* | 5/2021 | Gurbani .................. G10L 15/26 |
| 2021/0144250 A1 | 5/2021 | Molly et al. |
| 2021/0201238 A1 | 7/2021 | Archana et al. |
| 2021/0390268 A1* | 12/2021 | Pandey .................. G06N 5/025 |
| 2022/0293099 A1* | 9/2022 | Lee ......................... G10L 15/22 |
| 2023/0289836 A1* | 9/2023 | Chopra .............. G06Q 30/0203 |

* cited by examiner

FIG. 10

```
                                                                    1500
```

```
┌─────────────────────────────────────────────────────────────┐
│   ACCESSING A MERGED TRANSCRIPT FOR THE TWO-WAY COMMUNICATION│
│   SESSION ASSOCIATED WITH A VOICE BOT, WHEREIN THE MERGED    │
│   TRANSCRIPT COMPRISES A TEXT TRANSCRIPT OF A VOICE BOT      │
│   SEGMENT, A TEXT TRANSCRIPT OF A HUMAN VOICE SEGMENT, AND   │
│   SURVEY DATA DESCRIBING THE TWO-WAY COMMUNICATION SESSION   │
│                           1502                                │
└─────────────────────────────────────────────────────────────┘
                               │
                               ▼
┌─────────────────────────────────────────────────────────────┐
│  AUTOMATICALLY PROCESSING THE MERGED TRANSCRIPT TO IDENTIFY A│
│  CUSTOMER ISSUE AND LANGUAGE DATA ASSOCIATED WITH RESOLUTION │
│                   OF THE CUSTOMER ISSUE                      │
│                          1504                                │
└─────────────────────────────────────────────────────────────┘
                               │
                               ▼
┌─────────────────────────────────────────────────────────────┐
│  DYNAMICALLY UPDATING THE VOICE BOT TO INCLUDE THE LANGUAGE  │
│  DATA AND A BOT PROMPT ASSOCIATED WITH THE CUSTOMER ISSUE    │
│                    AND THE LANGUAGE DATA                     │
│                           1506                                │
└─────────────────────────────────────────────────────────────┘
```

FIG. 15

1700

ACCESSING A PLURALITY OF MERGED TRANSCRIPTS FOR A PLURALITY OF TWO-WAY COMMUNICATION SESSIONS ASSOCIATED WITH A VOICE BOT, WHEREIN EACH MERGED TRANSCRIPT OF THE PLURALITY OF MERGED TRANSCRIPTS COMPRISES A TEXT TRANSCRIPT OF A VOICE BOT SEGMENT, A TEXT TRANSCRIPT OF A HUMAN VOICE SEGMENT, AND SURVEY DATA DESCRIBING THE TWO-WAY COMMUNICATION SESSION
1702

AUTOMATICALLY PROCESSING THE PLURALITY MERGED TRANSCRIPTS TO IDENTIFY A CUSTOMER ISSUE AND LANGUAGE DATA ASSOCIATED WITH RESOLUTION OF THE CUSTOMER ISSUE
1704

DYNAMICALLY GENERATING A USER INTERFACE COMPRISING SOURCE INFORMATION FROM THE PLURALITY OF MERGED TRANSCRIPTS FOR THE LANGUAGE DATA ASSOCIATED WITH RESOLUTION OF THE CUSTOMER ISSUE
1706

FIG. 17

TARGETED GENERATIVE AI FROM MERGED COMMUNICATION TRANSCRIPTS

CROSS-REFERENCE TO RELATED APPLICATIONS

The present application claims the priority benefit of U.S. Provisional Patent Application No. 63/351,939, filed on Jun. 14, 2022 and titled "MERGED TRANSCRIPTS AND AUTOMATED SCRIPT GENERATION FOR COMMUNICATION SYSTEMS", the disclosure of which is hereby incorporated by reference in its entirety for all purposes.

FIELD

The present disclosure relates generally to facilitating two-way communications. In some examples, automated transcripts of human agent, bot agent, and feedback portions of a two-way communication are generated as a merged transcript. In some examples, the merged transcript is used to automatically generate scripts, decision branches, training data for generative artificial intelligence, or other such data to update bot agent functionality.

BACKGROUND

Clients often use telephony systems and/or network-based chat systems to field communications from users seeking assistance with products or services. Communication systems that support such user interactions may allow users to speak or chat with a live representative of the client. Such communication systems may additionally or alternatively use automated bot systems for two-way interactions with users. Automated bot systems can use decision tree scripts to attempt to resolve customer issues.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

Examples described herein relate to communication systems configured to provide information to users with assisted computing-based systems, which can be referred to as "bots". Such systems can be configured to provide assistance and to facilitate a two-way communication for a wide variety of user inquiries. Given that the nature of the user inquiry covers a broad possible range, categorizing a user intent associated with system communications and identifying appropriate systems for a response is a primary concern in providing a user with a positive experience.

A communication system can be associated with many different bots to assist with the wide variety of user inquiries. Because bots can be complex to generate, a bot may not have responses for all customer issues that are presented to a bot. When an issue the bot is not capable of handling is presented, the bot can transfer the customer to a human agent, that can help to resolve the customer issue. Examples described herein can generate merged transcripts of human and bot (e.g., non-human) agent interactions with a customer. This merged data can then be used in automated identification of an issue, and details of the issue resolution. The merged data can be standardized across many different two-way communications, to allow new types of customer issues or new solutions to be dynamically and automatically identified by a system. Such new issues and solutions can then be dynamically and automatically integrated into a bot system, leaving human agents to address complex and novel issues, rather than previously seen issues where solutions are known and able to be automated.

Certain embodiments of the present disclosure include a system. The system may include one or more data processors; and a non-transitory computer-readable storage medium containing instructions which, when executed on the one or more data processors, cause the one or more data processors to perform the methods described above and herein.

Certain embodiments of the present disclosure include a computer-program product tangibly embodied in a non-transitory machine-readable storage medium, including instructions configured to cause a data processing apparatus to perform the methods described above and herein.

BRIEF DESCRIPTION OF THE DRAWINGS

The present disclosure is described in conjunction with the appended figures:

FIG. 10 is an illustration of aspects of a two-way communication that can be used in accordance with examples described herein;

FIG. 15 is a flowchart illustrating another method in accordance with some aspects described herein;

FIG. 17 is a flowchart illustrating another method in accordance with some aspects described herein;

Figure 1:
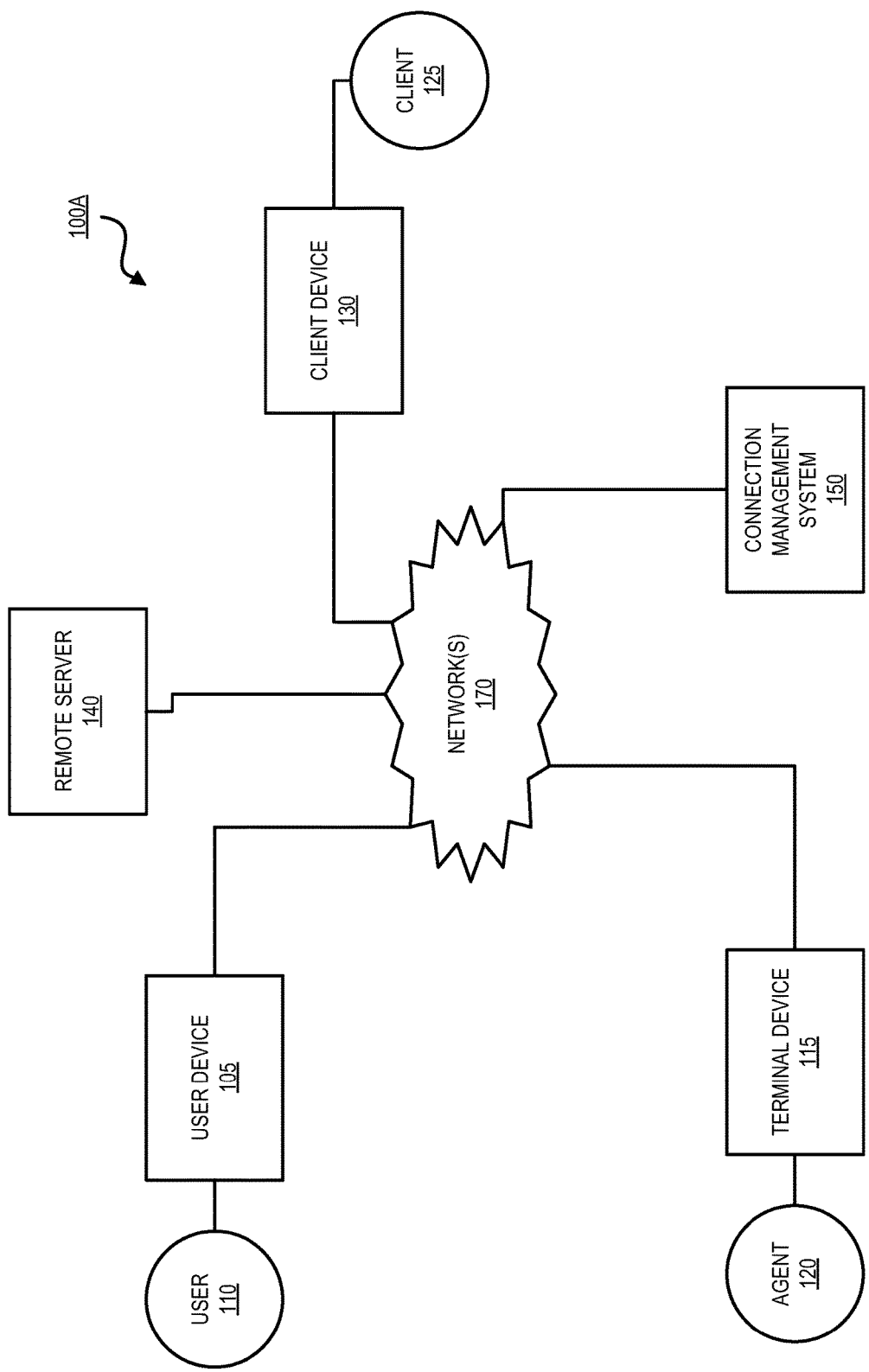
FIG. 1 shows a block diagram of an embodiment of a network interaction system that can be used in accordance with examples described herein.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred examples of embodiment(s) only and is not intended to limit the scope, applicability or configuration of the disclosure. Rather, the ensuing description of the preferred examples of embodiment(s) will provide those skilled in the art with an enabling description for implementing preferred examples of embodiment. It is understood that various changes can be made in the function and arrangement of elements without departing from the spirit and scope as set forth in the appended claims.

As described above, examples relate to communication systems configured to provide information to users with assisted computing-based systems. The assisted computing bases systems can include support for human agents, and non-human agents, which can be referred to as "bots". When a user (e.g., an individual or customer of a business) contacts or is contacted via a two-way communication system for information related to a client (e.g., a merchant or business providing information or service via the two-way communication system), such agents can communicate with customers in attempts to resolve customer issues. In many such systems, the interactions between a customer and individual agents are separate, and so each agent interaction generates a separate interaction record. Aspects described herein include operations for generating a merged transcript file that can include transcripts of all agent interactions as part of a unified attempt to resolve a customer issue. Such a merged transcript can include transcripts from one or more human agents as well as transcripts from one or more non-human agents.

Such automated transcripts can then be to provide feedback and machine-learning training data associated with automated systems to identify customer issues, generate confidence in customer issue resolution, identification of communication details involved in issue resolution that may be automated (e.g., included in future bot functions), and failure points for existing bots and scripts. Such analyses may then be used for both non-automated script generation tools (e.g., tools used by human script designers to generate new scripts or improve existing scripts, as well as automated script generation tools.

Automated script generation tools can include machine learning feedback systems that integrate various aspects of merged transcript analysis to dynamically improve bot operation and scripts available during system operations. Such details that can be used with machine learning feedback can include identifying causal relationships between human agent actions and successful issue resolution, triggers for successful customer issue identification, and resolution confidence details that can be used to automatically generate automated actions or scripts in future bot or script systems. In addition to action identification, automated systems may identify language data generated by a non-human agent that can be automatically used to generate an automated script. For example, if one or more human agents repeatedly use similar language to resolve a particular type of customer issue, an automated system can select language associated with the human agent generated language, and generate an automated script associated with the human agent language that can be used in the future by non-human agents in attempts to resolve similar customer issues. Feedback on the success of such automatically generated scripts can then be used to validate and/or improve such scripts. In another example, a human agent may identify cues from text that prompt the human-agent to inquire if the customer would prefer to use an alternate language (e.g., a language different than an initial or default language in use by the system). Repeated instances of similar cues receiving an affirmative response from a customer may be used to automatically generate an automated script associated with aspects of such an interaction. In different instances, such an automated script may not only generically query whether an alternate language may be preferred, but may include a specific language in the query based on past associations between an identified prompt or keyword and a particular language. When an affirmative response is received by the non-human agent, the non-human agent may automatically either switch to interactions in the preferred language, or coordinate routing of a two-way communication to an agent able to interact in the preferred language.

FIG. 1 shows a block diagram of an embodiment of a network interaction system 100 which implements and supports certain embodiments and features as described herein. Certain embodiments relate to establishing a connection channel between a network device 105 (which can be operated by a user 110) and a terminal device 115 (which can be operated by an agent 120). In certain embodiments, the network interaction system 100 can include a client device 130 associated with a client 125.

In certain embodiments, a user 110 (e.g., a customer) can be an individual contacting a merchant (e.g., a client 125)

communication service provided by a remote server 140. The client 125 can be an entity that provides, operates, or runs a web site, an online service, a business, or individuals employed by or assigned by such an entity to perform the tasks available to a client 125 as described herein. The agent 120 can be an individual, such as a support agent tasked with providing support or information to the user 110 regarding the website or online service. Out of a large number of agents, a subset of agents may be appropriate for providing support or information for a particular client 125. The agent 120 may be affiliated or not affiliated with the client 125. Each agent can be associated with one or more clients 125. In some non-limiting examples, a user 110 can be an individual looking for assistance for an issue from a personal computing device, a client 125 can be a company that sells products and uses a communication system to resolve customer issues, and an agent 120 can be a representative employed by the company. In various embodiments, the user 110, client 125, and agent 120 can be other individuals or entities.

While FIG. 1 shows only a single network device 105, terminal device 115 and client device 130, an interaction system 100 can include multiple or many (e.g., tens, hundreds or thousands) of each of one or more of these types of devices. Similarly, while FIG. 1 shows only a single user 110, agent 120 and client 125, an interaction system 100 can include multiple or many of each of one or more of such entities. Thus, it may be necessary to determine which terminal device is to be selected to communicate with a given network device. Further complicating matters, a remote server 140 may also be configured to receive and respond to select network-device communications.

A connection management system 150 can facilitate strategic routing of communications. A communication can include a message with content (e.g., defined based on input from an entity, such as typed or spoken input). The communication can also include additional data, such as data about a transmitting device (e.g., an IP address, account identifier, device type and/or operating system); a destination address; an identifier of a client; an identifier of a webpage or webpage element (e.g., a webpage or webpage element being visited when the communication was generated or otherwise associated with the communication) or online history data; a time (e.g., time of day and/or date); and/or destination address. Other information can be included in the communication. In some instances, connection management system 150 routes the entire communication to another device. In some instances, connection management system 150 modifies the communication or generates a new communication (e.g., based on the initial communication). The new or modified communication can include the message (or processed version thereof), at least some (or all) of the additional data (e.g., about the transmitting device, webpage or online history and/or time) and/or other data identified by connection management system 150 (e.g., account data associated with a particular account identifier or device). The new or modified communication can include other information as well.

In some aspects, transcript generation and automated bot script generation as described herein can operate as part of connection management system 150 to engage in initial information gathering from the customer (e.g., user 110) and for routing communications from user device 105 to client device 130, terminal device 115, remote server 140, or any other appropriate device. In some aspects, connection management system and remote server 140 can be part of a shared system that includes a transcript generation functionality to gather information for connection management system 150 operations, including subsequent assistance of agent 120 and terminal device 115 by the human or non-human agent functionality of a remote server 140 or other functionality provided by a connection management system 150 that includes additional functionality.

Part of strategic-routing facilitation by a connection management system 150 can include establishing, updating and using one or more connection channels between network device 105 and one or more terminal devices 115. For example, upon receiving a communication from network device 105, connection management system 150 can first estimate to which client (if any) the communication corresponds using information from communication that will be included in the merged transcript for the communication. In some aspects, a merged transcript can be generated in real-time by merging separate transcripts from different systems into a central merged transcript for the communication. In other systems, the different systems (e.g., human agents, routing, non-human agents, etc.) can gather separate transcript data that is merged at a trigger point (e.g., completion of the communication, a fixed time of day, a trigger based on idle system resources, etc.) Upon identifying a client, connection management system 150 can identify a terminal device 115 associated with the client for communication with network device 105. In some instances, the identification can include evaluating a profile of each of a plurality of agents (or experts or delegates), each agent (e.g., agent 120) in the plurality of agents being associated with a terminal device (e.g., terminal device 115). The evaluation can relate to content in a network-device message. For example, a system executed in a server associated with connection management system 150 can receive a voice message or other information (e.g., text, video, or any combination of communication data) from user device 105, and use that information to determine an issue (e.g., scheduling, tech support, order status, etc.) associated with user 110 and a two-way communication to be established with a terminal device 115 to resolve the customer issue. In some instances, connection management system 150 can determine whether any connection channels are established between network device 105 and a terminal device associated with the client (or remote server 140) and, if so, whether such channel is to be used to exchange a series of communications including the communication.

Upon selecting a terminal device 115 to communicate with network device 105, connection management system 150 can establish a connection channel between the network device 105 and terminal device 115 (e.g., a voice communication channel, a video channel including voice data, or a channel including any combination of audio, video, and text). In some instances, connection management system 150 can transmit a message to the selected terminal device 115. The message may request an acceptance of a proposed assignment to communicate with a network device 105 or identify that such an assignment has been generated. The message can include information about network device 105 (e.g., IP address, device type, and/or operating system), information about an associated user 110 (e.g., language spoken, duration of having interacted with client, skill level, sentiment, and/or topic preferences), a received communication, code (e.g., a clickable hyperlink) for generating and transmitting a communication to the network device 105, and/or an instruction to generate and transmit a communication to network device 105.

In one instance, communications between network device 105 and terminal device 115 can be routed through connection management system 150. Such a configuration can allow connection management system 150 to monitor the communication exchange and to detect issues (e.g., as defined based on rules) such as non-responsiveness of either device or extended latency. Further, such a configuration can facilitate selective or complete storage of communications, which may later be used, for example, to assess a quality of a communication exchange and/or to support learning to update or generate routing rules so as to promote particular post-communication targets.

In some embodiments, connection management system 150 can monitor the communication exchange in real-time and perform automated actions (e.g., rule-based actions) based on the live communications. For example, when connection management system 150 determines that a communication relates to a particular item (e.g., product), connection management system 150 can automatically transmit an additional message to terminal device 115 containing additional information about the item (e.g., quantity of item available, links to support documents related to the item, or other information about the item or similar items). Transcription and automated script generation as described herein can keep records of actions taken by a system and by human agents operating in a system, and can generate automated versions of human agent actions in automated scripts that can be integrated into system operation for automated actions in future operation of the system.

In one instance, a designated terminal device 115 can communicate with network device 105 without relaying communications through connection management system 150. One or both devices 105, 115 may (or may not) report particular communication metrics or content to connection management system 150 to facilitate communication monitoring and/or data storage.

As mentioned, connection management system 150 may route select communications to a remote server 140. Remote server 140 can be configured to provide information in a predetermined manner. For example, remote server 140 may access defined one or more text passages, video clips, voice recordings, and/or other such files to transmit in response to a communication. Remote server 140 may select a particular text passage, recording or file based on, for example, an analysis of a received communication (e.g., a semantic or mapping analysis).

Routing and/or other determinations or processing performed at connection management system 150 can be performed based on rules and/or data at least partly defined by or provided by one or more client devices 130. For example, client device 130 may transmit a communication that identifies a prioritization of agents, terminal-device types, and/or topic/skill matching. As another example, client device 130 may identify one or more weights to apply to various variables potentially impacting routing determinations (e.g., language compatibility, predicted response time, device type and capabilities, and/or terminal-device load balancing). It will be appreciated that which terminal devices and/or agents are to be associated with a client may be dynamic. Communications from client device 130 and/or terminal devices 115 may provide information indicating that a given terminal device and/or agent is to be added or removed as one associated with a client. For example, client device 130 can transmit a communication with IP address and an indication as to whether a terminal device with the address is to be added or removed from a list identifying client-associated terminal devices. Such selections can additionally be used to determine system operations as part of a two-way communication. Such functionality can include initial data gathering (e.g., to identify customer purchases, accounts, or other information associated with user device 105), scheduling, or issue identification prior to terminal device 115 routing.

Each communication (e.g., between devices, between a device and connection management system 150, between remote server 140 and connection management system 150 or between remote server 140 and a device) can occur over one or more networks 170. Any combination of open or closed networks can be included in the one or more networks 170. Examples of suitable networks include the Internet, a personal area network, a local area network (LAN), a wide area network (WAN), or a wireless local area network (WLAN). Other networks may be suitable as well. The one or more networks 170 can be incorporated entirely within or can include an intranet, an extranet, or a combination thereof. In some instances, a network in the one or more networks 170 includes a short-range communication channel, such as a Bluetooth or a Bluetooth Low Energy channel. In one embodiment, communications between two or more systems and/or devices can be achieved by a secure communications protocol, such as secure sockets layer (SSL) or transport layer security (TLS). In addition, data and/or transactional details may be encrypted based on any convenient, known, or to be developed manner, such as, but not limited to, Data Encryption Standard (DES), Triple DES, Rivest-Shamir-Adleman encryption (RSA), Blowfish encryption, Advanced Encryption Standard (AES), CAST-128, CAST-256, Decorrelated Fast Cipher (DFC), Tiny Encryption Algorithm (TEA), eXtended TEA (XTEA), Corrected Block TEA (XXTEA), and/or RC5, etc.

A network device 105, terminal device 115 and/or client device 130 can include, for example, a portable electronic device (e.g., a smart phone, tablet, laptop computer, or smart wearable device) or a non-portable electronic device (e.g., one or more desktop computers, smart appliances, servers, and/or processors). Connection management system 150 can be separately housed from network, terminal and client devices or may be part of one or more such devices (e.g., via installation of an application on a device). Remote server 140 may be separately housed from each device and connection management system 150 and/or may be part of another device or system. While each device, server and system in FIG. 1 is shown as a single device, it will be appreciated that multiple devices may instead be used. For example, a set of network devices can be used to transmit various communications from a single user, or remote server 140 may include a server stack. As part of systems and operations described above, the connection management system 150 can be implemented as a special purpose computer specially configured to facilitate hold bot messaging as described herein. Similarly, in some aspects, a user device 105, a remote server 140, a terminal device 115, or any other device described herein can be configured as a special purpose computer customized to facilitate hold bot messaging as described herein. In some aspects, such special purpose computing devices can be specially customized with hardware configured for hold bot functionality. In some aspects such special purpose computing devices can be specially configured using instructions stored in non-transitory computer readable storage media.

A software agent or application may be installed on and/or executable on a depicted device, system or server. In one instance, the software agent or application is configured such that various depicted elements can act in complementary manners. For example, a software agent on a device can be configured to collect and transmit data about device usage to a separate connection management system, and a software application on the separate connection management system can be configured to receive and process the data. In some aspects, the system can provide bot associated audio communications to authorize such automated data collection, or can provide voice, video, or text prompts for a user to accept or select various data collection options prior to routing to terminal device 115.

Figure 2:
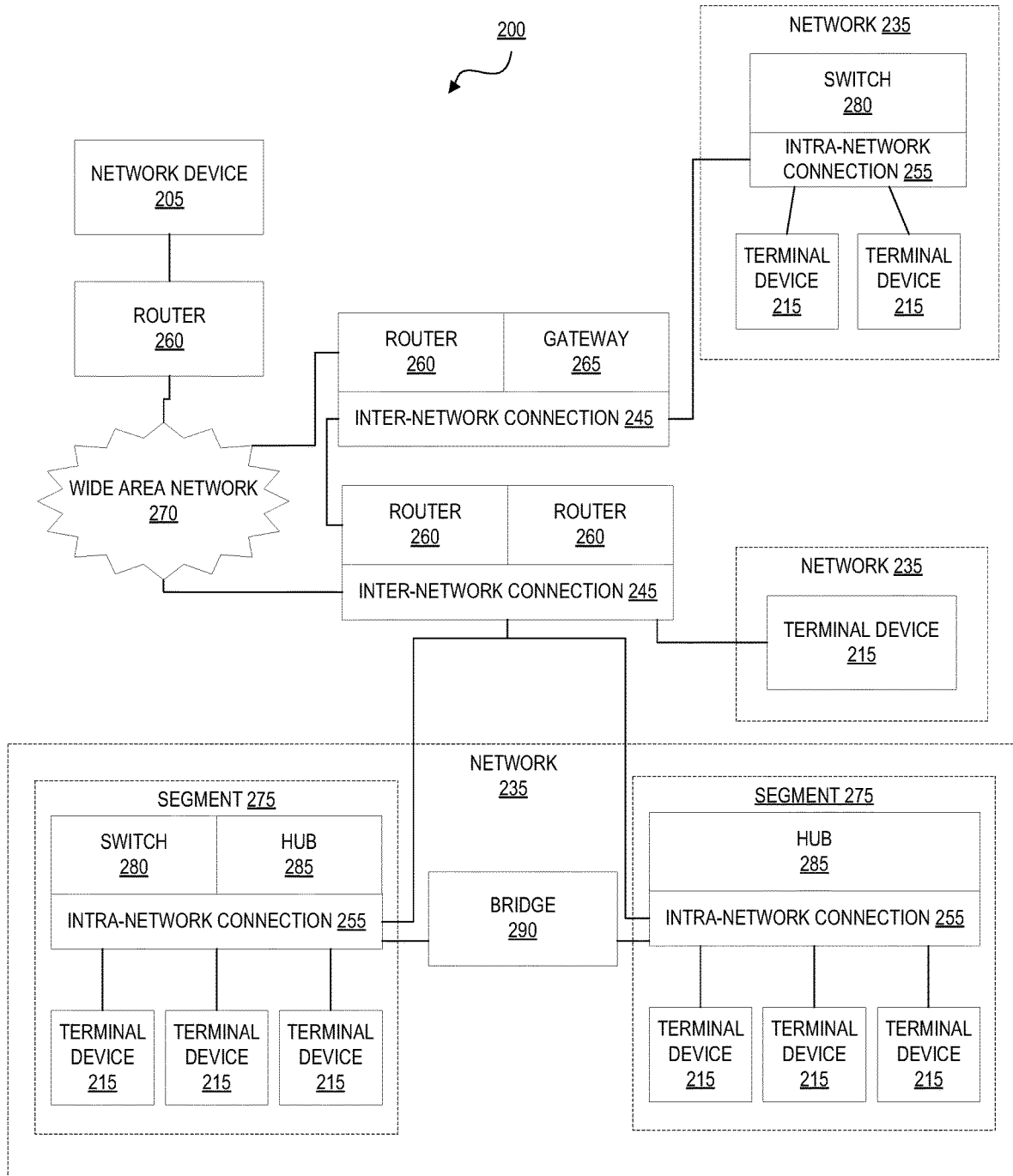
FIG. 2 shows a block diagram of another embodiment of a network interaction system that can be used in accordance with examples described herein.

FIG. 2 shows a block diagram of another embodiment of a network interaction system 200. Generally, FIG. 2 illustrates a variety of components configured and arranged to enable a network device 205 to communicate with one or more terminal devices 215. The depicted instance includes nine terminal devices 215 included in three local-area networks 235. Any of the described devices can support automated transcript generation and analysis of transcripts for bot improvement in future two-way communications as described herein.

In some instances, a communication from network device 205 includes destination data (e.g., a destination IP address) that at least partly or entirely indicates which terminal device is to receive the communication. Network interaction system 200 can include one or more inter-network connection components 245 and/or one or more intra-network connection components 255 that can process the destination data and facilitate appropriate routing.

Each of inter-network connection component 245 can be connected to a plurality of networks 235 and can have multiple network cards installed (e.g., each card connected to a different network). For example, an inter-network connection component 245 can be connected to a wide-area network 270 (e.g., the Internet) and one or more local-area networks 235. In the depicted instance, in order for a communication to be transmitted from network device 205 to any of the terminal devices, in the depicted system, the communication must be handled by multiple inter-network connection components 245.

When an inter-network connection component 245 receives a communication (or a set of packets corresponding to the communication), inter-network connection component 245 can determine at least part of a route to pass the communication to a network associated with a destination. The route can be determined using, for example, a routing table (e.g., stored at the router), which can include one or more routes that are pre-defined, generated based on an incoming message (e.g., from another router or from another device) or learned.

Examples of inter-network connection components 245 include a router 260 and a gateway 265. An inter-network connection component 245 (e.g., gateway 265) may be configured to convert between network systems or protocols. For example, gateway 265 may facilitate communication between Transmission Control Protocol/Internet Protocol (TCP/IP) and Internetwork Packet Exchange/Sequenced Packet Exchange (IPX/SPX) devices.

Upon receiving a communication at a local-area network 235, further routing may still need to be performed. Such intra-network routing can be performed via an intra-network connection component 255, such as a switch 280 or hub 285. Each intra-network connection component 255 can be connected to (e.g., wirelessly or wired, such as via an Ethernet cable) multiple terminal devices 215. Hub 285 can be configured to repeat all received communications to each device to which it is connected. Each terminal device can then evaluate each communication to determine whether the terminal device is the destination device or whether the communication is to be ignored. Switch 280 can be configured to selectively direct communications to only the destination terminal device.

In some instances, a local-area network 235 can be divided into multiple segments, each of which can be associated with independent firewalls, security rules and network protocols. An intra-network connection component 255 can be provided in each of one, more or all segments to facilitate intra-segment routing. A bridge 290 can be configured to route communications across segments 275.

To appropriately route communications across or within networks, various components analyze destination data in the communications. For example, such data can indicate which network a communication is to be routed to, which device within a network a communication is to be routed to or which communications a terminal device is to process (versus ignore). However, in some instances, it is not immediately apparent which terminal device (or even which network) is to participate in a communication from a network device.

To illustrate, a set of terminal devices may be configured so as to provide similar types of responsive communications. Thus, it may be expected that a query in a communication from a network device may be responded to in similar manners regardless to which network device the communication is routed. While this assumption may be true at a high level, various details pertaining to terminal devices can give rise to particular routings being advantageous as compared to others. For example, terminal devices in the set may differ from each other with respect to (for example) which communication channels are supported, geographic and/or network proximity to a network device and/or characteristics of associated agents (e.g., knowledge bases, experience, languages spoken, availability, general personality or sentiment, etc.). Accordingly, select routings may facilitate faster responses that more accurately and/or completely respond to a network-device communication. A complication is that static routings mapping network devices to terminal devices may fail to account for variations in communication topics, channel types, agent availability, and so on.

Figure 3A:
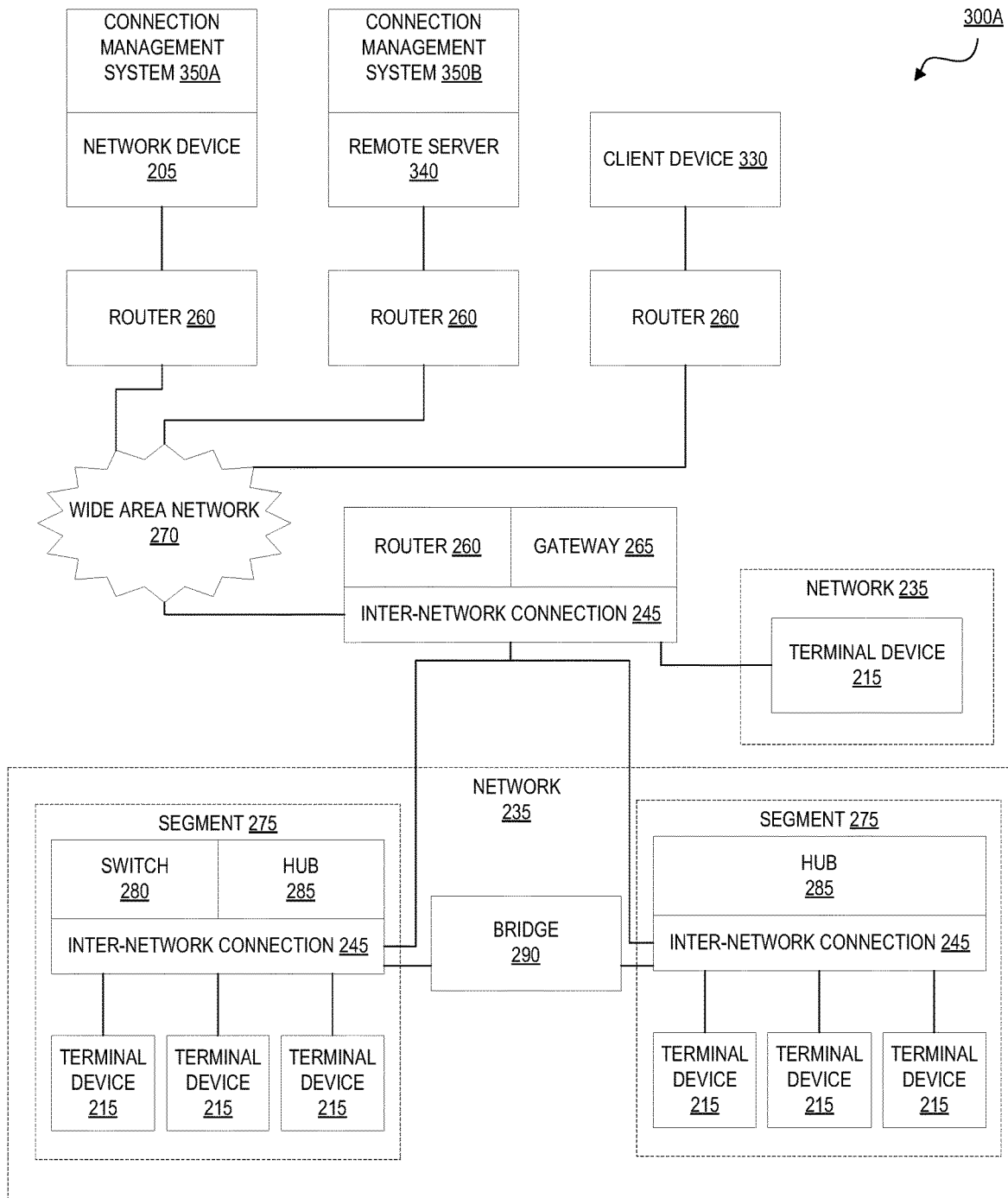
FIGS. 3A-3C show block diagrams of other embodiments of a network interaction system that includes a connection management system that can be used in accordance with examples described herein.
Figure 3B:
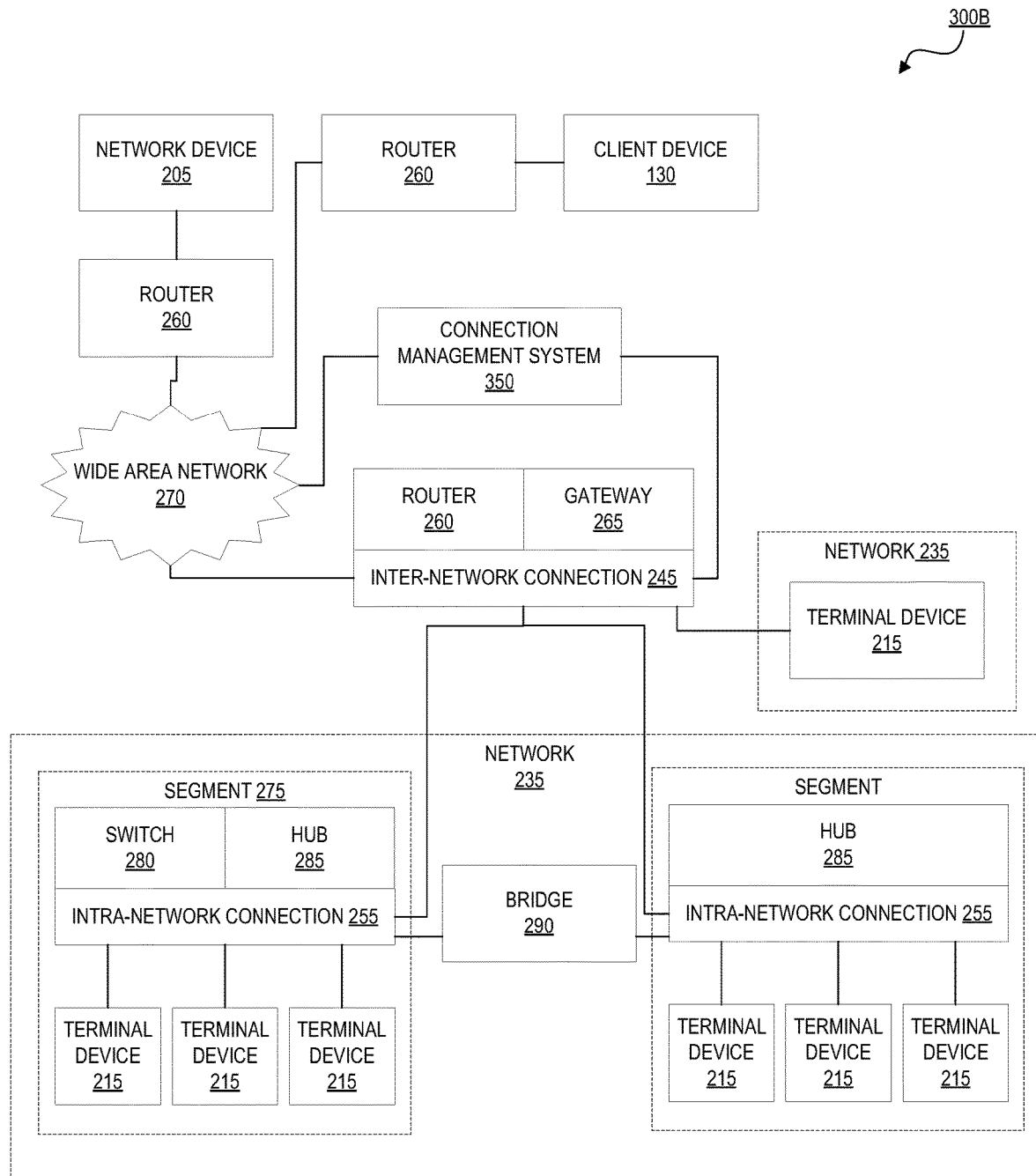
Figure 3C:
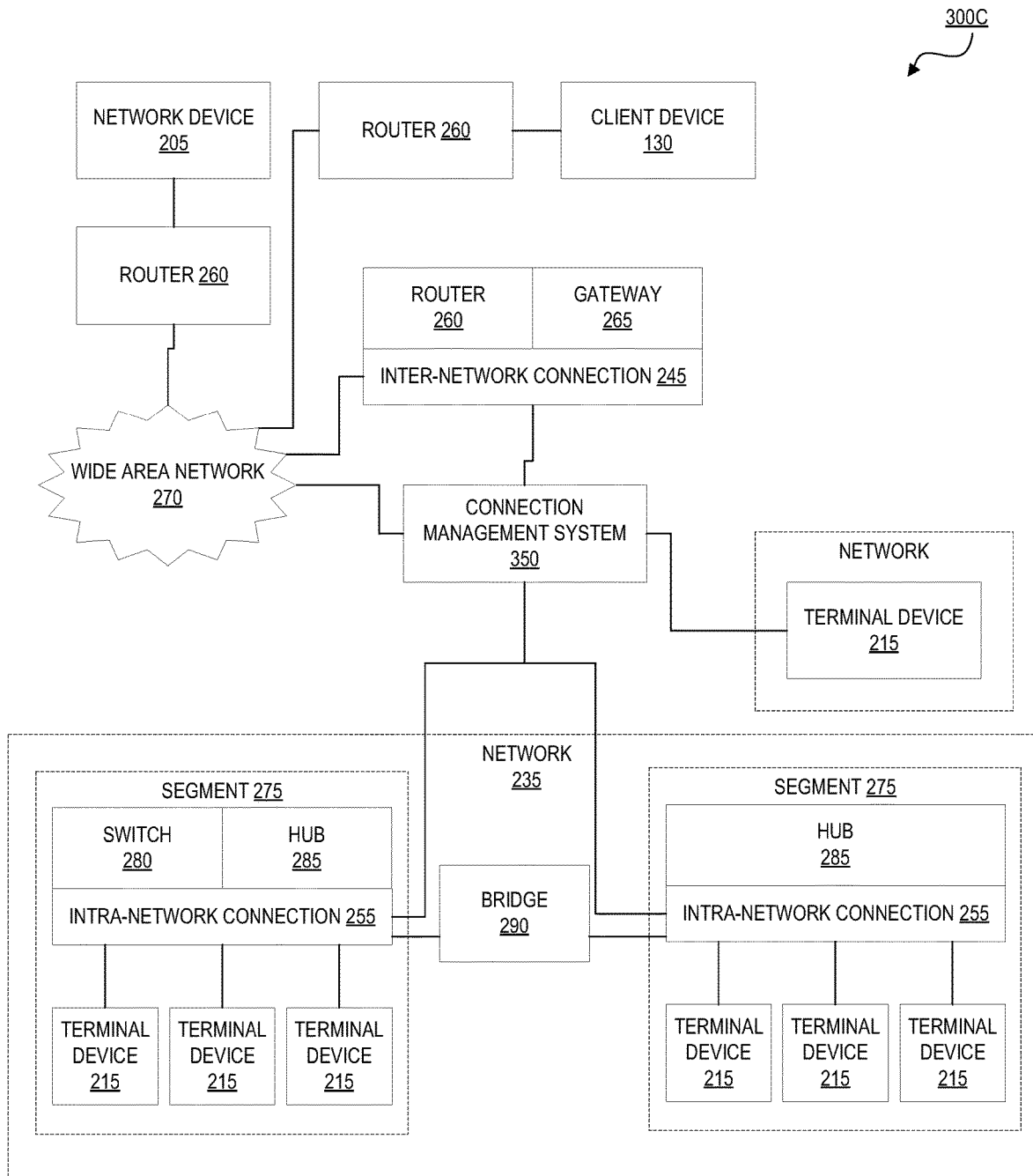

FIGS. 3A-3C show block diagrams of other embodiments of a network interaction systems 300A, 300B, and 300C that include a connection management system. Each of the depicted systems 300A-C show only 2 local-area networks 235 for simplicity, though it can be appreciated that embodiments can be extended to expand the number of local-area networks. Each of systems 300A-C include a corresponding connection management system(s) 350 (e.g., 350A, 350B, etc.), which can identify which terminal device is to communicate with network device 205, can establish and manage (e.g., maintain or close) connection channels, can determine whether and when to re-route communications in an exchange, and so on. Thus, connection management system 350 can be configured to dynamically, and in real-time, evaluate communications, agent availability, capabilities of terminal devices or agents, and so on, to influence routing determinations.

In FIG. 3A, connection management system 350 is associated with each of network device 205 and a remote server 340 (e.g., connection management system 350A is associated with network device 205 and connection management system 350B is associated with remote server 340). For example, connection management system 350A and/or connection management system 350B can be installed or stored as an application on each of network device 205 and remote server 340, respectively. Execution of the application(s) can facilitate, for example, a communication between network device 205 and remote server 340 to identify a terminal device 215 selected to participate in a communication exchange with network device 205. The identification can be made based on one or more factors disclosed herein (e.g., availability, matching between a communication's topic/level of detail with agents' or terminal devices' knowledge bases, predicted latency, channel-type availability, and so on).

A client device 330 can provide client data indicating how routing determinations are to be made. For example, such data can include: indications as to how particular characteristics are to be weighted or matched or constraints or biases (e.g., pertaining to load balancing or predicted response latency). Client data can also include specifications related to when communication channels are to be established (or closed) or when communications are to be re-routed to a different network device. Client data can be used to define various client-specific rules, such as rules for communication routing and so on. The client device 330 can additionally provide client data indicating how data systems (e.g., privacy rules) are to be used and managed as part of two-way communications, including two-way voice communications.

Connection management system 350B executing on remote server 340 can monitor various metrics pertaining to terminal devices (e.g., pertaining to a given client), such as which communication channels are supported, geographic and/or network proximity to a network device, communication latency and/or stability with the terminal device, a type of the terminal device, a capability of the terminal device, whether the terminal device (or agent) has communicated with a given network device (or user) before and/or characteristics of associated agents (e.g., knowledge bases, experience, languages spoken, availability, general personality or sentiment, etc.). Accordingly, connection management system 350B may be enabled to select routings to facilitate faster responses that more accurately and/or completely respond to a network-device communication based on the metrics.

In the example depicted in FIG. 3A, a communication exchange between network device 205 and remote server 340 can facilitate early identification of a destination address. Network device 205 may then use the destination address to direct subsequent communications. For example, network device 205 may send an initial communication to remote server 340 (e.g., via one or more inter-network connections and a wide-area network), and remote server 340 may identify one or more corresponding clients. Remote server 340 may then identify a set of terminal devices associated with the one or more corresponding clients and collect metrics for those terminal devices. The metrics can be evaluated (e.g., by remote server 340) so as to select a terminal device to involve in a communication exchange, and information pertaining to the terminal device (e.g., an IP address) can be sent to network device 205. In some embodiments, remote server 340 may continuously or periodically collect and evaluate metrics for various terminal devices and store evaluation results in a data store. In such embodiments, upon identifying a set of terminal devices associated with the one or more corresponding clients, remote server 340 can access the stored evaluation results from the data store and select a terminal device to involve in the communication exchange based on the stored evaluation results.

In FIG. 3B, connection management system 350 can be configured to serve as a relay and/or destination address.

Thus, for example, a set of network devices 205 may transmit communications, each identifying connection management system 350 as a destination. Connection management system 350 can receive each communication and can concurrently monitor a set of terminal devices (e.g., so as to generate metrics for each terminal device). Based on the monitoring and a rule, connection management system 350 can identify a terminal device 215 to which it may relay each communication. Depending on the embodiment, terminal device communications may similarly be directed to a consistent destination (e.g., of connection management system 350) for further relaying, or terminal devices may begin communicating directly with corresponding network devices. These embodiments can facilitate efficient routing and thorough communication monitoring.

The embodiment depicted in FIG. 3C is similar to that in FIG. 3B. However, in some embodiments, connection management system 350 is directly connected to intra-network components (e.g., terminal devices, intra-network connections, or other).

It will be appreciated that many variations of FIGS. 3A-3C are contemplated. For example, connection management system 350 may be associated with a connection component (e.g., inter-network connection component 245 or intra-network connection component 255) such that an application corresponding to connection management system 350 (or part thereof) is installed on the component. The application may, for example, perform independently or by communicating with one or more similar or complementary applications (e.g., executing on one or more other components, network devices or remote servers).

Figure 4:
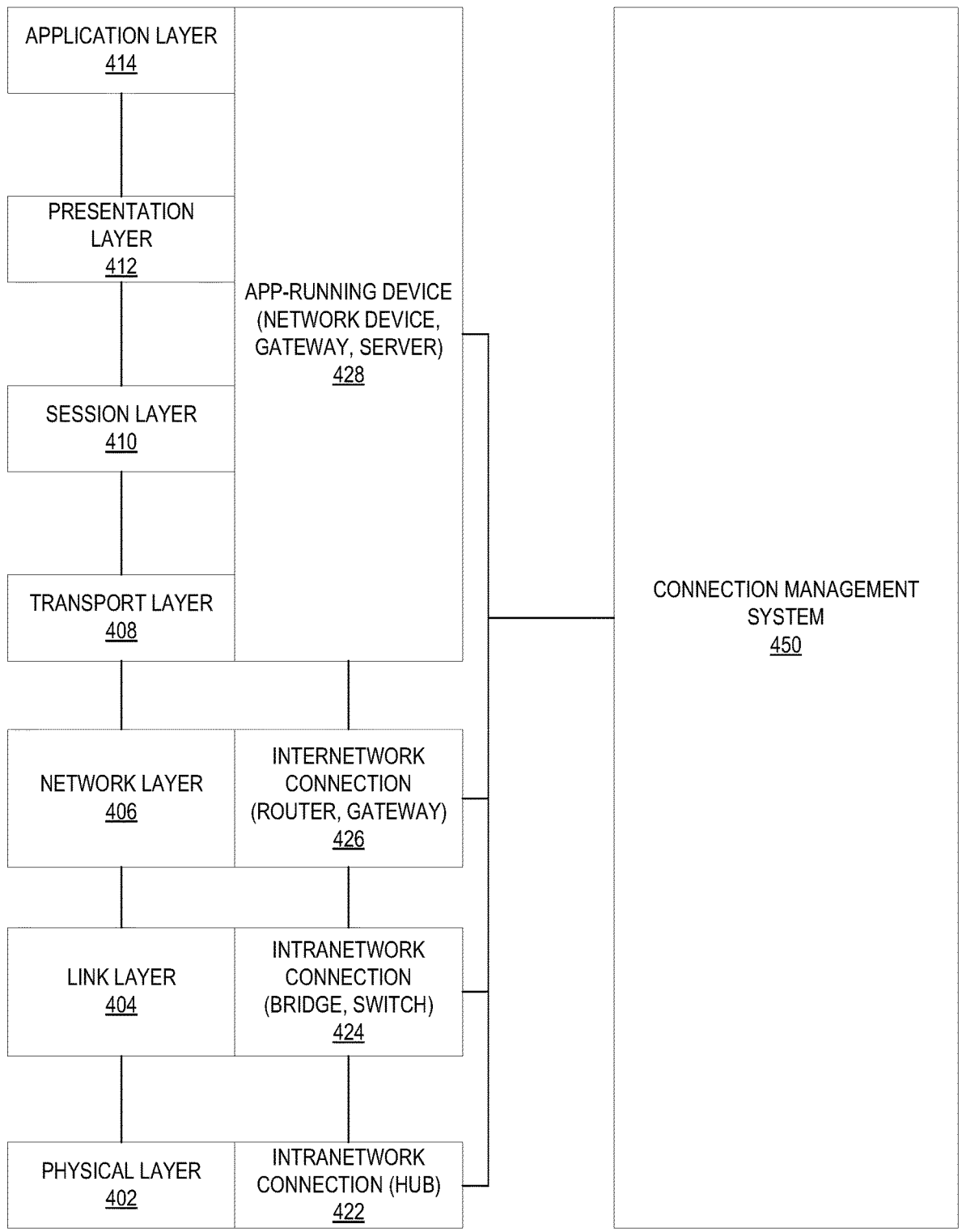
FIG. 4 shows a representation of a protocol-stack mapping of connection components' operation that can be used in accordance with examples described herein.

FIG. 4 shows a representation of a protocol-stack mapping 400 of connection components' operation. More specifically, FIG. 4 identifies a layer of operation in an Open Systems Interaction (OSI) model that corresponds to various connection components.

The OSI model can include multiple logical layers 402-414. The layers are arranged in an ordered stack, such that layers 402-412 each serve a higher level and layers 404-414 are each served by a lower layer. The OSI model includes a physical layer 402. Physical layer 402 can define parameters for physical communication (e.g., electrical, optical, or electromagnetic). Physical layer 402 also defines connection management protocols, such as protocols to establish and close connections. Physical layer 402 can further define a flow-control protocol and a transmission mode.

A link layer 404 can manage node-to-node communications. Link layer 404 can detect and correct errors (e.g., transmission errors in the physical layer 402) and manage access permissions. Link layer 404 can include a media access control (MAC) layer and logical link control (LLC) layer.

A network layer 406 can coordinate transferring data (e.g., of variable length) across nodes in a same network (e.g., as datagrams). Network layer 406 can convert a logical network address to a physical machine address.

A transport layer 408 can manage transmission and receipt quality. Transport layer 408 can provide a protocol for transferring data, such as a Transmission Control Protocol (TCP). Transport layer 408 can perform segmentation/desegmentation of data packets for transmission and can detect and account for transmission errors occurring in layers 402-406. A session layer 410 can initiate, maintain and terminate connections between local and remote applications. Sessions may be used as part of remote-procedure interactions. A presentation layer 412 can encrypt, decrypt and format data based on data types known to be accepted by an application or network layer.

An application layer 414 can interact with software applications that control or manage communications. Via such applications, application layer 414 can (for example) identify destinations, local resource states or availability and/or communication content or formatting. Various layers 402-414 can perform other functions as available and applicable.

Intra-network connection components 422, 424 are shown to operate in physical layer 402 and link layer 404. More specifically, a hub can operate in the physical layer, such that operations can be controlled with respect to receipts and transmissions of communications. Because hubs lack the ability to address communications or filter data, they possess little to no capability to operate in higher levels. Switches, meanwhile, can operate in link layer 404, as they are capable of filtering communication frames based on addresses (e.g., MAC addresses).

Meanwhile, inter-network connection components 426, 428 are shown to operate on higher levels (e.g., layers 406-414). For example, routers can filter communication data packets based on addresses (e.g., IP addresses). Routers can forward packets to particular ports based on the address, so as to direct the packets to an appropriate network. Gateways can operate at the network layer and above, perform similar filtering and directing and further translation of data (e.g., across protocols or architectures).

A connection management system 450 can interact with and/or operate on, in various embodiments, one, more, all or any of the various layers. For example, connection management system 450 can interact with a hub so as to dynamically adjust which terminal devices the hub communicates. As another example, connection management system 450 can communicate with a bridge, switch, router or gateway so as to influence which terminal device the component selects as a destination (e.g., MAC, logical or physical) address. By way of further examples, a connection management system 450 can monitor, control, or direct segmentation of data packets on transport layer 408, session duration on session layer 410, and/or encryption and/or compression on presentation layer 412. In some embodiments, connection management system 450 can interact with various layers by exchanging communications with (e.g., sending commands to) equipment operating on a particular layer (e.g., a switch operating on link layer 404), by routing or modifying existing communications (e.g., between a network device and a terminal device) in a particular manner, and/or by generating new communications containing particular information (e.g., new destination addresses) based on the existing communication. Thus, connection management system 450 can influence communication routing and channel establishment (or maintenance or termination) via interaction with a variety of devices and/or via influencing operating at a variety of protocol-stack layers.

Figure 5:
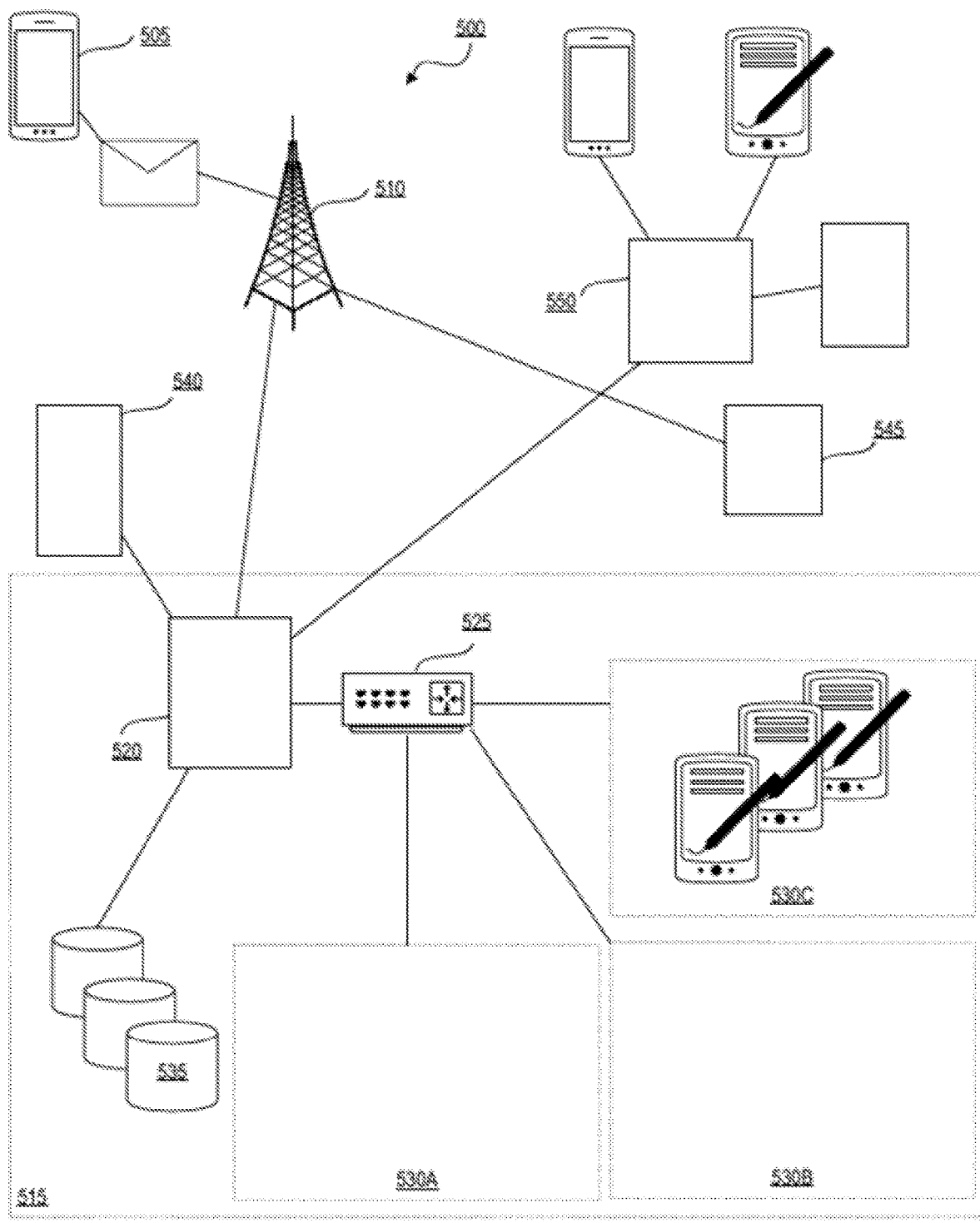
FIG. 5 represents a multi-device communication exchange system that can be used in accordance with examples described herein.

FIG. 5 represents a multi-device communication exchange system 500 according to an embodiment. System 500 includes a network device 505 configured to communicate with a variety of types of terminal devices over a variety of types of communication channels.

In the depicted instance, network device 505 can transmit a communication over a cellular network (e.g., via a base station 510). The communication can be routed to an operative network 515. Operative network 515 can include a connection management system 520 that receives the communication and identifies which terminal device is to respond to the communication. Such determination can depend on identifying a client to which that communication pertains (e.g., based on a content analysis or user input indicative of the client) and determining one or more metrics for each of one or more terminal devices associated with the client. For example, in FIG. 5, each cluster of terminal devices 530a-c can correspond to a different client. The terminal devices may be geographically co-located or dispersed. The metrics may be determined based on stored or learned data and/or real-time monitoring (e.g., based on availability).

Connection management system 520 can communicate with various terminal devices via one or more routers 525 or other inter-network or intra-network connection components. Connection management system 520 may collect, analyze and/or store data from or pertaining to communications, terminal-device operations, client rules, and/or user-associated actions (e.g., online activity) at one or more data stores. Such data may influence communication routing.

Notably, various other devices can further be used to influence communication routing and/or processing. For example, in the depicted instance, connection management system 520 also is connected to a web server 540. Thus, connection management system 520 can retrieve data of interest, such as technical item details, and so on.

Network device 505 may also be connected to a web server (e.g., including a web server 545). In some instances, communication with such a server provided an initial option to initiate a communication exchange with connection management system 520. For example, network device 505 may detect that, while visiting a particular webpage, a communication opportunity is available and such an option can be presented.

One or more elements of communication system 500 can also be connected to a social-networking server 550. Social networking server 550 can aggregate data received from a variety of user devices. Thus, for example, connection management system 520 may be able to estimate a general (or user-specific) behavior of a given user or class of users.

Figure 6:
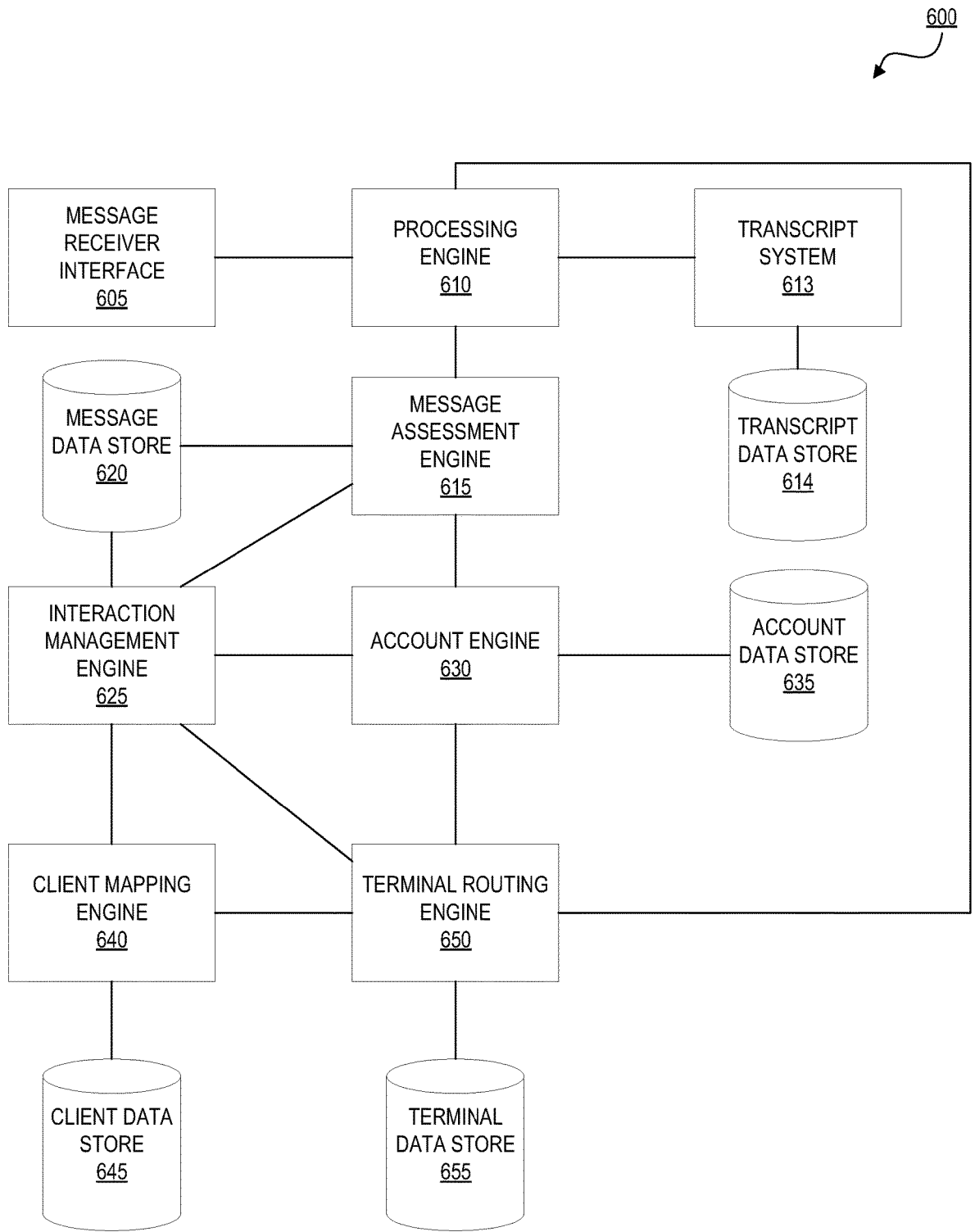
FIG. 6 shows a block diagram of an embodiment of a connection management system that can be used in accordance with examples described herein.

FIG. 6 shows a block diagram of an embodiment of a connection management system 600 including a transcript system 613 connected to transcript data store 614 to support merged transcript and automated operations. A message receiver interface 605 can receive a message. In some instances, the message can be received, for example, as part of a communication transmitted by a source device (e.g., housed separately from connection management system 600 or within a same housing), such as a network device or terminal device. In some instances, the communication can be part of a series of communications or a communicate exchange, which can include a series of audio (e.g., voice, pre-recorded bot messages, etc.) messages exchanged being routed between two devices (e.g., a customer network device and a human agent terminal device). This message or communication exchange may be part of and/or may define an interaction between the devices. A communication channel or operative channel can include one or more protocols (e.g., routing protocols, task-assigning protocols and/or addressing protocols) used to facilitate routing and a communication exchange between the devices.

In some instances, the message can include a message generated based on inputs received at a local or remote user interface. For example, the message can include a message that was generated based on button or key presses or recorded speech signals. In one instance, the message includes an automatically generated message, such as one generated upon detecting that a network device is presenting a particular app page or webpage or has provided a particular input command (e.g., key sequence). The message can include an instruction or request, such as one to initiate a communication exchange.

In some instances, the message can include or be associated with an identifier of a client. For example, the message can explicitly identify the client (or a device associated with the client); the message can include or be associated with a webpage or app page associated with the client; the message can include or be associated with a destination address associated with a client; or the message can include or be associated with an identification of an item (e.g., product) or service associated with the client. To illustrate, a network device may be presenting an app page of a particular client, which may offer an option to transmit a communication to an agent. Upon receiving user input corresponding to a message, a communication may be generated to include the message and an identifier of the particular client.

A processing engine 610 may process a received communication and/or message. Processing can include, for example, extracting one or more particular data elements (e.g., a message, a client identifier, a network-device identifier, an account identifier, and so on). Processing can include transforming a formatting or communication type (e.g., to be compatible with a particular device type, operating system, communication-channel type, protocol and/or network).

As described herein, a transcript system 613 can be used to manage interactions not directly part of communications between a human agent and a customer. When a customer initiated a communication with a system to address a customer issue, or a human agent uses a communication system to reach out to a customer, the interactions managed by the connection management system (e.g., human agent and non-human agent) are recorded and centralize by transcript system 613 for storage in transcript data store 614. As described above, in some implementations, different interaction systems (e.g., separate human agent systems and non-human agent systems) may generate separate transcripts that are merged independently. In other systems, real-time merged transcripts are generated as communications occur using the transcript system 613. As communications are routed separately (e.g., based on selection of a given human agent or bot system for use with a communication), the connection management system 600 can be used to confirm systems involvement in a given communication for independent system transcript coordination, or managing real-time merged transcripts, depending on the implementation.

A message assessment engine 615 may assess the (e.g., extracted or received) message. The assessment can include identifying, for example, one or more categories or tags for the message. Examples of category or tag types can include (for example) topic, sentiment, complexity, and urgency. In some aspects, this can further include initial triggers to determine whether a voice communication from a customer is to be managed by a bot or a human agent. A difference between categorizing and tagging a message can be that categories can be limited (e.g., according to a predefined set of category options), while tags can be open. A topic can include, for example, a technical issue, a use question, or a request. A category or tag can be determined, for example, based on a semantic analysis of a message (e.g., by identifying keywords, sentence structures, repeated words, punctuation characters and/or non-article words); user input (e.g., having selected one or more categories); and/or message-associated statistics (e.g., typing speed and/or response latency). In some aspects, for example, the message assessment engine 615 can be used to assess whether a voice communication from a customer is to be converted to text and relayed to a human agent, or used to access other functionality, such as managing an end to the communication, rescheduling the communication, information management, or other such functionality that may be performed between the customer and the script or bot without human agent involvement.

In some instances, message assessment engine 615 can determine a metric for a message. A metric can include, for example, a number of characters, words, capital letters, all-capital words or instances of particular characters or punctuation marks (e.g., exclamation points, question marks and/or periods). A metric can include a ratio, such as a fraction of sentences that end with an exclamation point (or question mark), a fraction of words that are all capitalized, and so on.

Message assessment engine 615 can store a message, message metric and/or message statistic in a message data store 620. Each message can also be stored in association with other data (e.g., metadata), such as data identifying a corresponding source device, destination device, network device, terminal device, client, one or more categories, one or more stages and/or message-associated statistics). Various components of connection management system 600 (e.g., message assessment engine 615 and/or an interaction management engine 625) can query message data store 620 to retrieve query-responsive messages, message metrics and/or message statistics.

An interaction management engine 625 can determine to which device a communication is to be routed to, how the receiving and transmitting devices are to communicate, and any relevant bots to be used or recommended to an agent as part of a two-way communication. In some aspects, the interaction management system can manage an initial script to gather information and to assess a system for more detailed involvement. In some aspects, the interaction management engine 625 can manage scripts and associated bots for a given customer flow, as well as a transition to a human agent communication when scripts fail to achieve a satisfactory result, or when a sentiment analysis, or other such analysis, triggers a transition to a human agent from a non-human agent (e.g., a bot, machine learning system, automated script, etc.) In some implementations, interaction management engine 625 can additionally manage transitions in a communication between different human agents, between independent scripts or non-human agents, or any other such systems. Each of these determinations can depend, for example, on whether a particular network device (or any network device associated with a particular user) has previously communicated with a terminal device in a set of terminal devices (e.g., any terminal device associated with connection management system 600 or any terminal device associated with one or more particular clients).

Interaction management engine 625 can interact with an account engine 630 in various contexts. For example, account engine 630 may look up an identifier of a network device or terminal device in an account data store 635 to identify an account corresponding to the device. Further, account engine 630 can maintain data about previous communication exchanges (e.g., times, involved other device(s), channel type, resolution stage, topic(s) and/or associated client identifier), connection channels (e.g., indicating—for each of one or more clients—whether any channels exist, a terminal device associated with each channel, an establishment time, a usage frequency, a date of last use, any channel constraints and/or supported types of communication), user or agent preferences or constraints (e.g., related to terminal-device selection, response latency, terminal-device consistency, agent expertise, and/or communication-type preference or constraint), and/or user or agent characteristics (e.g., age, language(s) spoken or preferred, geographical location, interests, and so on). In some implementations, a merged transcript for a previously delayed communication can be accessed, and the initiated interaction from a customer can be associated with a previous merged transcript when the system identifies that a new interaction is a continuation of an attempt to resolve a single customer issue. In other implementations, other relationships between previous communications associated with a given customer can be generated and used in subsequent analysis of a merged transcript for a communication or a set of communications.

Further, interaction management engine 625 can alert account engine 630 of various connection-channel actions, such that account data store 635 can be updated to reflect the current channel data. For example, upon establishing a channel, interaction management engine 625 can notify account engine 630 of the establishment and identify one or more of: a network device, a terminal device, an account and a client. Account engine 630 can (in some instances) subsequently notify a user of the channel's existence such that the user can be aware of the agent consistency being availed.

Interaction management engine 625 can further interact with a client mapping engine 640, which can map a communication to one or more clients (and/or associated brands). In some instances, a communication received from a network device itself includes an identifier corresponding to a client (e.g., an identifier of a client, webpage, or app page). The identifier can be included as part of a message (e.g., which client mapping engine 640 may detect) or included as other data in a message-inclusive communication. Client mapping engine 640 may then look up the identifier in a client data store 645 to retrieve additional data about the client and/or an identifier of the client. In some instances, for example, a client (e.g., a merchant) may have an independent set of system scripts or feedback operations. The client mapping engine 640 can be used to generate analysis of transcripts and automated generation of scripts specific to a given client, while also providing some abstracted information that may be used for other clients.

In some instances, a message may not particularly correspond to any client. For example, a message may include a general query. Client mapping engine 640 may, for example, perform a semantic analysis on the message, identify one or more keywords and identify one or more clients associated with the keyword(s). In some instances, a single client is identified. In some instances, multiple clients are identified. An identification of each client may then be presented via a network device such that a user can select a client to communicate with (e.g., via an associated terminal device). In various aspects, client mapping engine 640, interaction management engine 625, client data store 645, and other such systems can be accessed by or integrated with issue resolution for multiple clients. For example, if independent clients have similar scheduling issues or other customer issues, feedback received in a communication associated with one client may be generalized to recommend scripts or other system operation improvements across operations for multiple clients. Other interactions may be client specific, such as resolutions to technical issues for a specific merchant. In some implementations, clients are provided selectable settings indicating whether abstract versions of data can be used and analyzed in a system to generate scripts that are general to other clients, or whether such information is to be withheld from feedback and analysis systems. In some implementations, a client user interface can identify customer issues, and allow a client to select which customer issued are allowed to be analyzed for general system improvement, which customer issues are to be analyzed only within the context of data for the particular client (e.g., a single merchant, without considering data from other merchant transcripts or allowing the data to influence automatic scripts for other merchants.) Client mapping engine 640 can thus allow clients control of how transcript data associated with the client is used or not used in automated script generation as described herein.

Client data store 645 can include identifications of one or more terminal devices (and/or agents) associated with the client. A terminal routing engine 650 can retrieve or collect data pertaining to each of one, more or all such terminal devices (and/or agents) so as to influence routing determinations. For example, terminal routing engine 650 may maintain a terminal data store 655, which can store information such as terminal devices' device types, operating system, communication-type capabilities, installed applications accessories, geographic location and/or identifiers (e.g., IP addresses). Some information can be dynamically updated. For example, information indicating whether a terminal device is available may be dynamically updated based on (for example) a communication from a terminal device (e.g., identifying whether the device is asleep, being turned off/on, non-active/active, or identifying whether input has been received within a time period); a communication routing (e.g., indicative of whether a terminal device is involved in or being assigned to be part of a communication exchange); or a communication from a network device or terminal device indicating that a communication exchange has ended or begun. The example of FIG. 6 includes separate data stores for transcript data store 614, client data store 645, account data store 635, and terminal data store 655. In some implementations, all such data can be part of a single database. In some aspects, different operation data can be stored and accessed separately from client selectable options (e.g., merchant based privacy settings, customer based privacy settings, etc.). In some aspects, different systems can store data separately (e.g., a single human agent system storing transcripts for the human agent, including partial transcripts for multiple communications with customers interacting with the human agent), and a transcript data store 614 can aggregate transcripts for individual communications or individual customer issues. Such data can then be analyzed to automatically generate scripts as described herein.

It will be appreciated that, in various contexts, being engaged in one or more communication exchanges does not necessarily indicate that a terminal device is not available to engage in another communication exchange. Various factors, such as communication types (e.g., voice), client-identified or user-identified target response times, and/or system loads (e.g., generally or with respect to a user) may influence how many exchanges a terminal device may be involved in.

Systems and methods described herein include communication systems involving both human and non-human (e.g., bot or automated script) interactions, as well as systems for transferring customer devices between such agents. The customer may use a network device to initiate a conversation with an agent regarding resolution of an issue. In some aspects, bot functionality can involve presentation of questions to clarify or narrow details of a user's intent or details of a user issue. Bot functionality can additionally allow collection of key customer issue details. Key user information may also be provided, such as order number, account number, and the like via the bot systems, to save human agent interaction time. Such "issue" tags or classifiers can be generated and used with stored data for aggregated analysis of system handling of similar issues, as well as automated processing of such data to generate automated scripts.

Figure 7A:
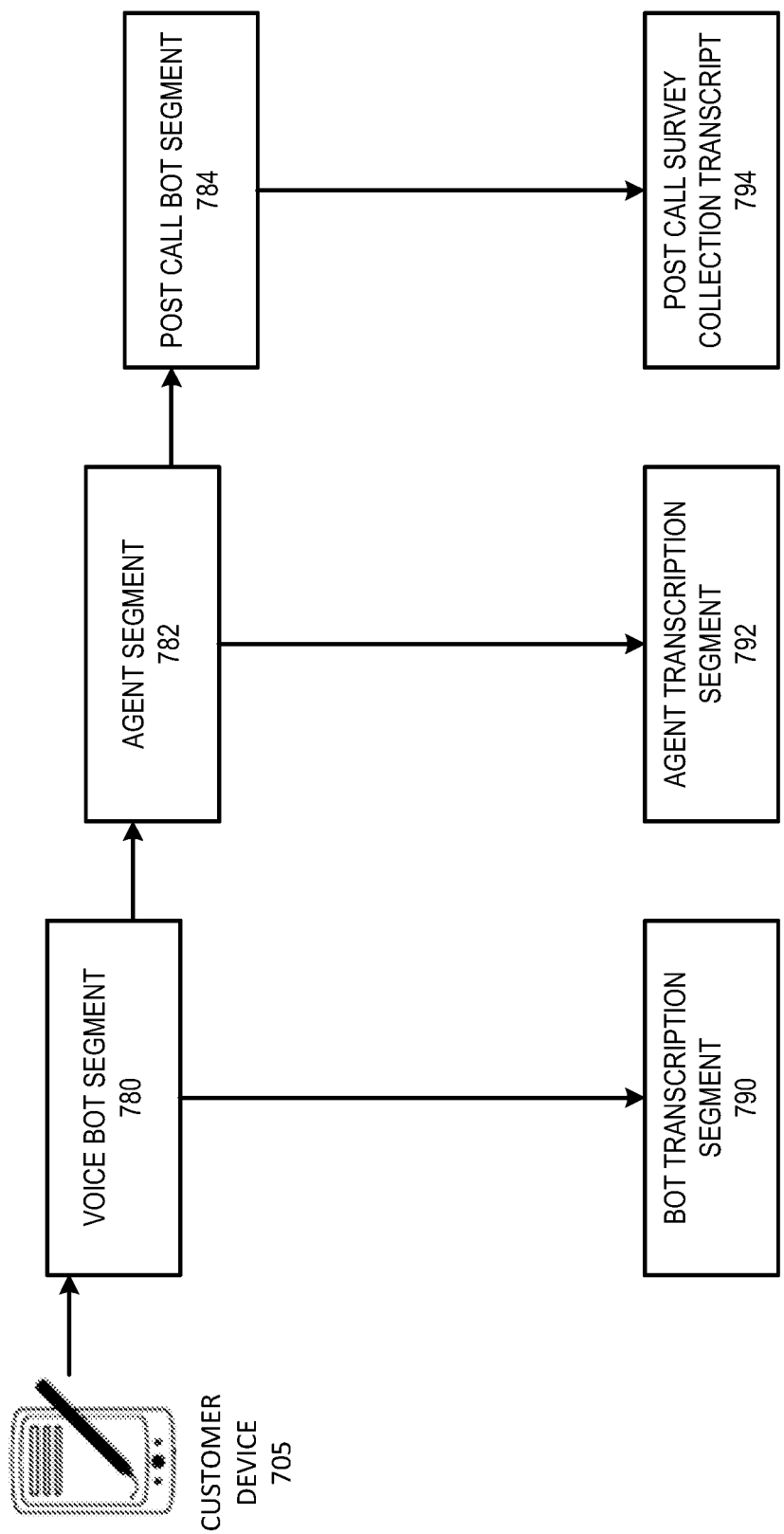
FIG. 7A illustrates aspects of a two-way communication session and associated input data used for merged transcripts in accordance with examples described herein.

FIG. 7A illustrates aspects of a two-way communication session and associated input data used for merged transcripts in accordance with examples described herein. FIG. 7A describes the use of customer device 705 (e.g., which may be similar to user device 105, or other such devices described herein) in communication with a communication system (e.g., connection management system 150, connection management system 600, etc.) During interactions with various different systems that the connection management system connects to the customer device 705, separate transcripts can be generated.

In the example of FIG. 7A, a two-way communication includes a voice bot segment (e.g., a portion of the two-way communication), a human agent segment 782, and a post call bot segment 784. As part of such system operations, separate transcripts are generated. In the example of FIG. 7A, a bot transcript segment 790 is generated from the voice bot segment, an agent transcription segment 792 is generated from the human agent segment 782, and a post call survey collection 794 is generated from the post call bot segment 784. Each of these segments may be generated by separate independent systems with separate transcript generation tools and formats. For example, the voice bot segment 780 may be associated with a set script communicated from an intake bot to the customer device 705. The bot transcription segment 790 can be made up of fixed communications from the voice bot as well as voice communications from the customer device 705. The bot segments can be text transcripts of known data that is part of a fixed script or script tree, and the customer portion of the transcript can be voice to text data. In some instances, such information can be stored as text along with an audio file, particularly in instances where the voice to text conversion for a customer device 705 may not be clear or where uncertainty in the meaning of the data from the customer device is important to analysis and unclear. Such information may have quality or confidence scores associated with natural language processing (NLP) of the customer data. Low quality data (e.g., due to a poor quality connection, background noise, or other issues that may cause understanding problems from the customer device 705 portion of the bot transcription segment 790) may be identified and processed to improve data quality, or may be flagged as having a quality below a threshold and not passed to the system. As the voice bot segment 780 proceeds with communications from the bot system to the customer device 705, and the customer device 705 provides responses, the data can be stored in a bot transcription segment 790 for the communication. As described above, such data can be associated with a customer, a client (e.g., merchant), an issue category (e.g., based on issue or intent identification), or other such data. The voice bot can provide any number of scripts to respond to communications from customer device 705. At some point in the communication between the customer device 705 and bot system(s) associated with the voice bot segment 780, a transition to a human agent occurs. As described herein, such a transition can be triggered by reaching a point in a script or bot tree path that automatically initiates a transfer to a human agent, a customer request (e.g., a voice input of "I want to speak to a person" from customer device 705), an automated real-time dynamic sentiment score reaching a threshold, or other such triggers.

A human agent segment 782 can include automated transcripts and recordings of voice data from both sides. Where in the voice bot segment 780, the text of the voice bot data is known, in the agent segment 782, the voice data from both the customer device 705 and a device of the human agent is recorded. In some aspects, a human agent may review the transcript following or during a communication to correct or provide annotation for automated transcript data, correcting automation errors and providing annotation context that can be used later during analysis of a complete communication transcript. The agent transcription segment 792 can thus include not only text of interactions between customers and human agents, but also additional context information provided by an agent. In some implementations, such information can be provided by a specialized agent interface that can provide both real-time transcript data, as well as system facilitation tools and information to a human agent. Additional such information is described below with respect to FIGS. 12 and 13. A post call bot segment 784 can then gather feedback information for post call survey collection 794 transcript. Such a separate survey system may include independent analysis systems, but can generate information that can be used for a complete merged transcript of data for an individual communication with a customer to resolve a customer issue.

The example of FIG. 7A illustrates a single transition from a voice bot segment 780 to a human agent segment 782, but in some implementations, multiple such transitions can occur between multiple bot segments (e.g., transitions to separate bot systems), multiple human agents (e.g., transition from one human agent to another human agent), or transfers back and forth between non-human and human agents). Additionally, a single feedback system is described, but in some examples, multiple feedback systems can be used. For example, one feedback system can include a voice based survey system directly following a communication, or as a delayed survey follow-up to a communication. Another feedback system can track customer actions associated with a communication, and can flag customer actions associated with an issue tagged in association with a given communication. For example, if a communication issue is flagged as a "product A order" issue, and the customer later cancels an order for product A or orders additional quantities of product A, a feedback system can flag such actions in association with a merged transcript for a client communication associated with the customer and the customer issue. Additionally, separate human agent feedback and bot analysis feedback can also be used in some systems.

Another example of such transitions can occur with routing for an alternate agent language, as indicated above. For example, when an interaction with an agent results in a customer being routed to a new agent (e.g., human or non-human) to provide an updated language interaction, the analysis described above can continue through multiple iterations. For example, as communications in the new language occur, the new interactions may indicate that a specific accent or dialect of the identified language would provide an improved interaction with the customer. Interactions between customers and human agents in the alternate language can be analyzed in the alternate language, and can be used to flag details of an interaction that indicate that an additional transfer or update would provide further improvement to the customer interaction. Such flags, in the original default language or any subsequent alternate language, can include not only specific words, but pronunciation cues or flags that a machine learning analysis of communication data can use to create associations that can then be used to generate automated scripts. In some implementations, the use of such scripts may be based on a pool of available agents that are qualified or flagged as able to provide such assistance. For example, an automated script generated from the prior human agent transcripts can not only identify language cues, but can automatically perform a check to see if a human agent having a particular language skill is logged on to an agent pool (e.g., indicating the human agent is available to engage in a two-way communication). If an appropriate human agent is available in the system, the script can proceed to facilitate a new language interaction based on both the identification of the cue and the availability of an appropriate agent.

Figure 7B:
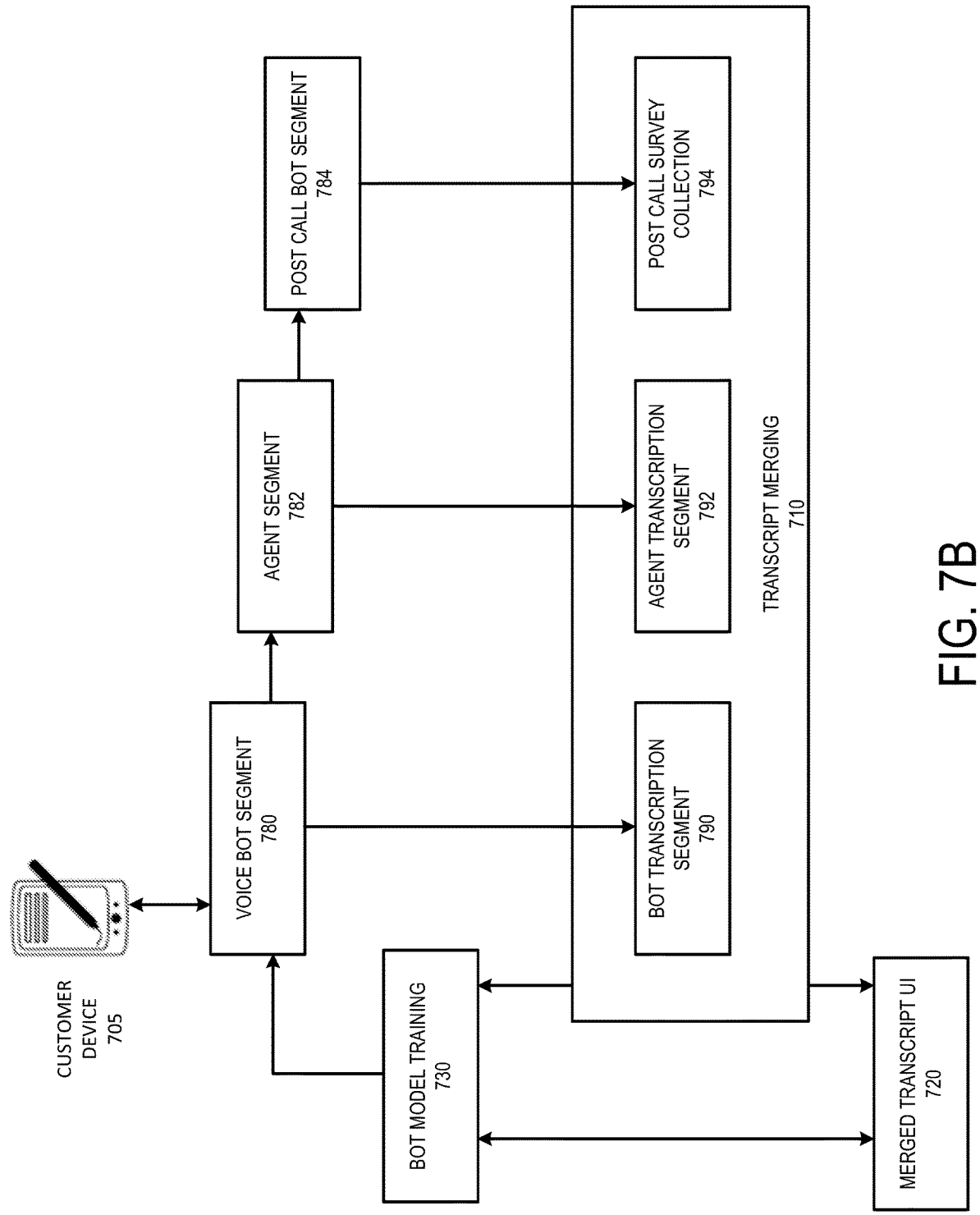
FIG. 7B illustrates aspects of a two-way communication session and associated input data used for merged transcripts and automated script generation from merged transcripts in accordance with examples described herein.

FIG. 7B illustrates aspects of a two-way communication session and associated input data used for merged transcripts and automated script generation from merged transcripts in accordance with examples described herein. As illustrated, examples described herein can take transcript data (e.g., bot transcription segment 790, agent transcription segment 792, post call survey collection 794 transcript), and generate a merged transcript. Such a merged transcript can be generated by an automated tool as part of a transcript merging system 710, or using other mechanisms. In some aspects, a merged transcript user interface system 720 is provided to a human agent associated with a communication, or to a script generation facilitator that can analyze data from merged transcripts to correct errors, clarify issues with voice to text conversion, and assist with script generation.

In some implementations, the merged transcript can be included in a database, such as transcript data store 614. The data from many different communications can be aggregated and analyzed together from such a database. As described herein, a variety of tags and annotation data can be used with merged transcripts to identify successful trends and to identify previously unrecognized solutions to issues. In some implementations, a neural network can be used to analyze sets of merged transcript data to identify solutions. For example, transcript data can be structured when merged to include a customer issue, a customer issue confidence score, resolution score, a sentiment score, and a set of actions and details associated with the resolution. A neural network model can be used to analyze merged transcripts to identify combinations of actions that result in positive sentiment scores, and positive resolutions scores, or any set of target feedback results. The analysis can identify when human agent actions or combinations of bot agent and human agent actions result in above expected feedback. When the machine learning analysis of aggregated transcripts identifies such actions resulting in above expected scoring, such actions can either be presented to a script designer via a merged transcript user interface, or can be automatically processed to generate a script that can be dynamically included in a bot model via bot model training 730, and used in voice bot segments of subsequent system communications with customer devices.

Merger of transcripts from multiple different systems and customer interactions allows standardized data sets across many customers, including many customers with similar characteristics, including issues across merchants (e.g., clients), issues within a merchant segment, actions that correlate with different sentiment scores (e.g., actions that achieve better than expected results when a sentiment score is low or high), or other such actions. The use of standardized data with an automated bot model training 730 system can allow generation of specially customized scripts for niche situations that may not be recognizable to an individual human agent, but that can be recognized by machine learning and model training across a shared set of merged data. Such niche customization using bot model training 730 feedback can include analysis and feedback of different bot voicing (e.g., pitch, tone, accent, wording, etc.) of similar content based on customer and communication segments (e.g., sentiment scores, issue values, and other criteria for a given communication. The bot model training can identify characteristics associated with success, and dynamically provide targeted scripts in real-time for future communication. Such analysis of merged transcript data can occur simultaneously for many different customers and different clients (e.g., merchants) utilizing a communication system at the same time. Bot model training and machine learning feedback can additionally occur dynamically and in real-time, such that when bot model training analysis identifies a set of operations from aggregated merged transcripts (e.g., from a database) that meet criteria for automation (e.g., a model identifies a threshold level of success and a threshold confidence score for a given set of operations), the system can dynamically update bots used by the system with scripts that are automatically generated from the transcript database. In some implementations, rather than dynamic inclusion of automated scripts into a live system that interacts with customers, the automatically generated scripts can be presented to a system operator via merged transcript UI, with options to dynamically integrate the automatically generated scripts based on operator selection. In some implementations, a client may select certain categories or thresholds for automated real-time inclusion of scripts into system operation, and alternate or additional thresholds for generation of a script and presentation of the automatic script to a system operator. Such client selections may be based on issue type, client product type, or any other characteristic selected by the client. Additional details related to such script generation are discussed below with respect to FIGS. 12 and 13.

Figure 7C:
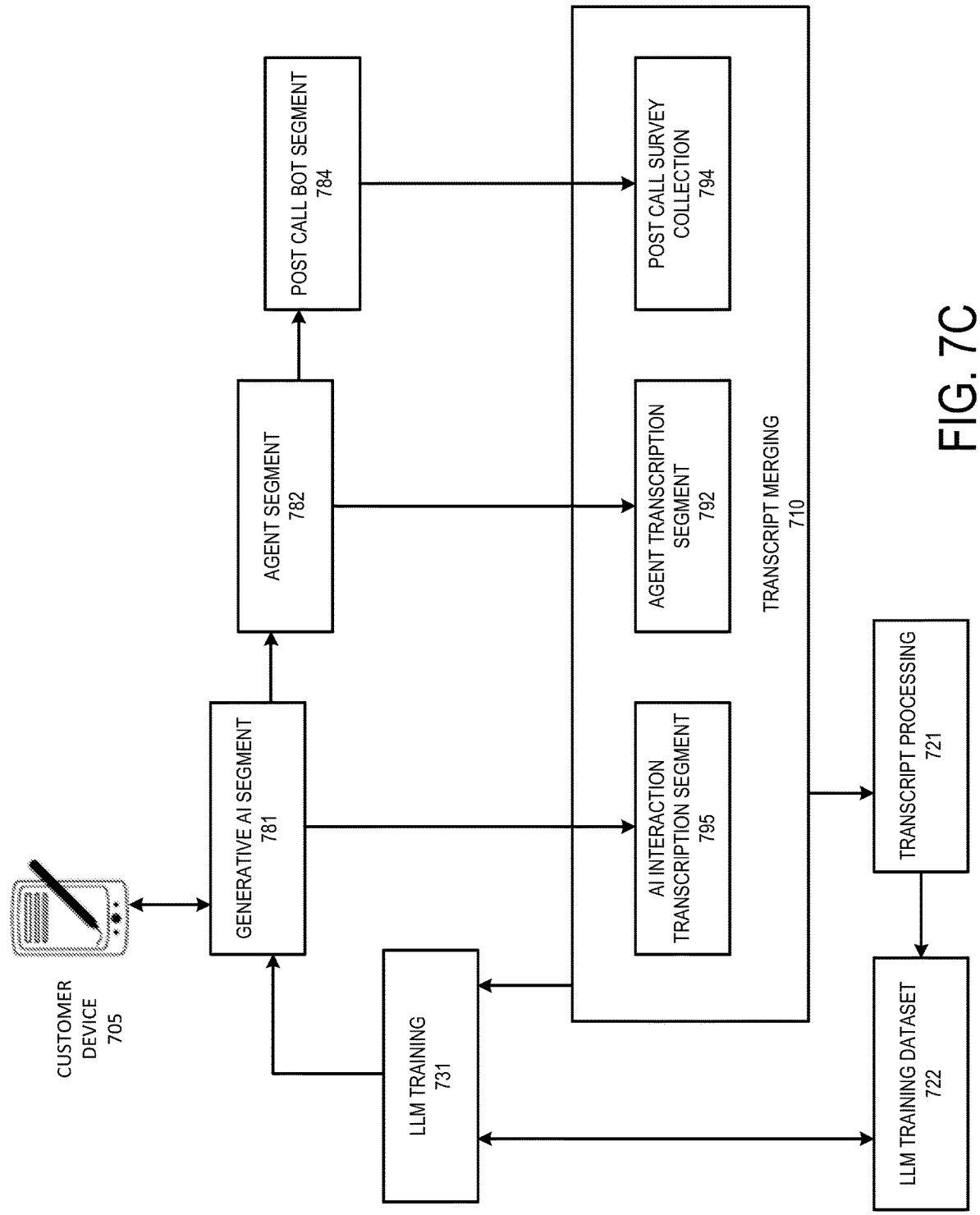
FIG. 7C illustrates aspects of a two-way communication session and associated input data used for merged transcripts and feedback training for large language models and associated generative artificial intelligence in accordance with examples described herein.

FIG. 7C illustrates aspects of a two-way communication session and associated input data used for merged transcripts and feedback training for large language models and associated generative artificial intelligence in accordance with examples described herein. Such generative AI systems can generate text in response to inputs (e.g., language) from a customer device 705. Such inputs can be received via voice, text, or any electronic input. Generative AI outputs can then similarly be provided to a customer device 705 via audio (e.g., text to voice machine language outputs), text, or any such communication channel. As illustrated, FIG. 7C is similar to the aspects illustrated in FIG. 7B, with adjustments to the use of bot systems specifically implemented as generative AI systems using large language models. In some aspects, implementations of FIG. 7B above can operate where bots interact with customers as part of voice bot segment 780 using generative AI systems. Such generative AI bot systems can be trained using large language models systems as an implementation of the bot model training 730 described above. FIG. 7C specifically describes an implementation where interactions between the customer device 705 and a generative AI system is used as part of a generative AI segment 781 (e.g., similar to the bot segment 780 above). A transcript of the interactions between the customer device 705 and the generative AI system from the generative AI segment 781 is used by the transcript merging 710 system as AI interaction transcription segment 795.

The merged transcript including the AI interaction transcription segment 795, the agent transcription segment 792, and the post call survey collection 794 can then be stored as part of an LLM training dataset 722. Large language models (LLMs) are machine-learning systems to model language. Such models can be implemented using neural networks with billions of network parameter weights. In some aspects, the post call survey collection 794 data can be used as part of transcript processing 721 to label text in other parts of the merged transcript to allow LLM training 731 to perform updates to the LLM used for the generative AI interactions with customers to include semi-supervised training (e.g., with the labeled text based on the feedback identifying certain interactions in the merged transcript as positive, negative, or associated with other characteristics that can be processed in different ways as part of LLM training 731). In some aspects post call survey 794 information can be used to remove certain transcripts or portions of certain transcripts from the LLM training dataset 722. In other aspects, additional filtering can be provided by the transcript processing 721, such as removing merged transcripts for agents having success or quality ratings below a certain threshold, or other such filtering. In some aspects, the transcript processing 721 can sort data into different training datasets based on content, subject matter, client details, or other such criteria. For example, a system may categorize devices and interactions, and identify agents and generative AI systems targeted for improved performance associated with a characteristic of a user of the device 705. Transcript processing 721 can be used to identify transcripts associated with improved performance for certain user characteristics, and can sort data into different datasets for training different generative AI systems targeted for improved interaction with users having the characteristics. Just as above, similar to the merged transcript user interface system 720, in some aspects, the transcript processing systems 721 can include an API or UI to allow system adjustments. For example, such interfaces can allow selection of preferences for language style, modification or addition of data labels to training datasets, or other such training design or modification.

As described above, merger of transcripts from multiple different systems and customer interactions allows standardized data sets across many customers, including many customers with similar characteristics, including issues across merchants (e.g., clients), issues within a merchant segment, actions that correlate with different sentiment scores (e.g., actions that achieve better than expected results when a sentiment score is low or high), or other such actions. The use of standardized data for an LLM training dataset can allow a standard generative AI system, but can also be used in conjunction with targeted alternate systems with context specific training. For example, rather than the generation of specially customized scripts for niche situations described above, generative AI systems targeted for non-standard situations can be used, and the system can use triggers or AI decision systems to switch between such different generative AI systems. Training and machine learning feedback can be used to identify when such systems are preferable, and can also be used to identify when such systems would be valuable but not available. Some such systems can use analysis triggers to prompt the generation of a targeted generative AI system using subsets of data from the LLM training dataset 722 based on information from merged transcripts and analysis of information from post call survey collection 794

In some implementations, the LLM training dataset(s) 722 can be included in a database, such as the transcript data store 614. The data from many different communications can be aggregated and analyzed together from such a database as part of the LLM training 731. As described herein, a variety of tags and annotation data can be used with merged transcripts to identify successful trends, to identify previously unrecognized solutions to issues, and to allow system customization and influence on expected generative AI interactions with users. Such information can, for example, identify problematic interactions and generate triggers to override generative AI responses or provide specific scripts for certain questions rather than generative AI information. The generative AI segment 781 can thus involve a mix of predefined scripts and generative output in response to user interactions from the device 705. For example, for identified paths where generative AI provides problematic responses, or when user inputs are identified as likely to result in undesired generative AI responses, predefined scripts can be triggered in place of generative language from a generative AI system.

Figure 8:
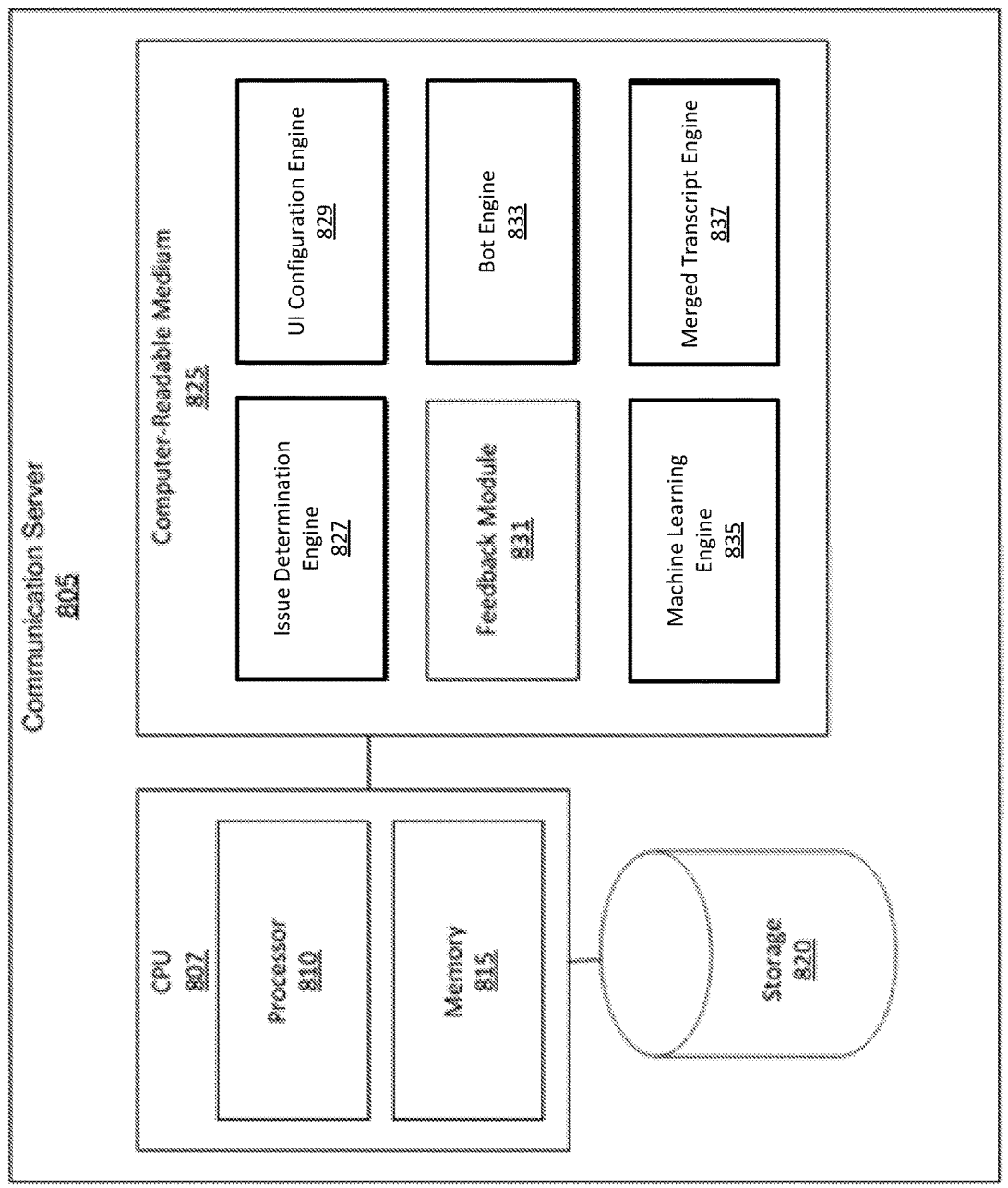
FIG. 8 shows a block diagram representing a communication server that can be used in accordance with examples described herein.

FIG. 8 shows a block diagram of a communication server 805 according to some embodiments. The communication server 805 can, in some examples, be implemented as a special purpose computer for transcription and automated script generation in accordance with aspects described herein. The communication server 805 may illustrate the internal components of the communication server or system used to implement operations of a communication system as described herein. The communication server 805 may include a central processing unit (CPU) 807, including a processor 810 and memory 815. The communication server 805 may further include storage 820.

The CPU 807 may be coupled to a computer-readable medium 825. The computer-readable medium 825 may have any number of modules and engines. Although six modules and engines are illustrated, it is contemplated that fewer or greater modules or engines may be implemented in the computer-readable medium 825 to perform the functions described herein. As shown in FIG. 8, the computer-readable medium 825 may include an issue determination engine 827, a UI configuration engine 829, a feedback module 831, a bot engine 833, a machine learning engine 835, and a merged transcript engine 837. In some implementations, the computer-readable medium 825 can be used to configure the server 805 as a special purpose computer that can implement transcription and script generation functions in accordance with aspects described herein. In some implementations, other engines or modules may be used, or the functions implemented by communication server 805 can be combined or distributed in other ways. Similarly, in some aspects, a user device 105, a remote server 105, a terminal device 115, or any other device described herein can be configured as a special purpose computer using instructions from the computer-readable medium 825 as configured for a given functionality =ng as described herein.

The issue determination engine 827 may be configured to, in conjunction with the processor 810, receive a request for a conversation. The request may be received from a network device operated by a user. The request may be received at a terminal device operated by an agent, for example. The issue determination engine 827 may further be configured to, in conjunction with the processor 810, determine an issue (e.g., a customer intent) for the conversation. The intent may be determined from the request. For example, the request may state, "I want my order status." The intent may be extracted from the request as "order status". Intent data can also be determined from a customer account or identifier data gathered upon call receipt, such as when previous requests have been received from a device. Such data can be stored in storage 820 or other database structures and used with issue determination engine 827 or any other element of a communication system described herein.

UI configuration engine 829 may include systems to implement an agent interface and/or a script management engine, or any other aspect of an interface for handling aspects of a communication in accordance with aspects described herein. In some aspects, an agent system involved in a communication may include not only a voice connection to a customer or user device, but can also include a computer based interface to facilitate customer issue resolution. Examples of such interfaces and operations of a UI configuration engine 829 are discussed below with respect to FIGS. 12 and 13.

In some implementations, the UI configuration engine 829 can be used to manage scripts and bots in a communication. For example, in some communications, a human agent can use bots or scripts to assist with issue resolution, and UI configuration engine 829 can be used to initiate use of bots or scripts from bot engine 833. Such operations can be used to track and monitor interactions between a customer and a bot during a communication, and to track transitions between different agents during a communication (e.g., between different human and non-human operation segments, as illustrated by FIGS. 7A and 7B.)

Feedback module 831 may be configured to, in conjunction with the processor 810, receive feedback on the conversation. During a voice communication, for example, a customer may be queried as to whether the customer is willing to interact with a voice based feedback system at the end of the communication system. Feedback module 831 can handle both asking the customer to interact with a feedback system, as well as gathering the feedback data when a customer agrees. Additionally, in some systems, a feedback module 831 can automatically generate resolution analysis even when a customer declines to interact directly with a feedback system. Such an automatic feedback can, for example, be based on a sentiment analysis of a completed communication, based on queues from a merged transcript to assess a resolution score, or other such metrics. In some aspects, rather than feedback module 831 having a separate transcript as described in FIGS. 7A and 7B, the feedback module 831 can generate feedback data from both a separate feedback system (e.g., the post call bot segment 784), and from analysis of a merged communication transcript received from a merged transcript engine. Such feedback can be fed into a machine learning engine 835 and an UI configuration engine 829 to modify future operations of the system (e.g., either automatically via engine 835 or via manual script selection using UI configuration engine 829). In some aspects, an agent can use UI elements from UI configuration engine 829 to annotate feedback for a communication, or to provide additional feedback to assist in scoring. The feedback may be provided by an agent operating the terminal device via UI configuration engine 839, by an automated sentiment system, by a customer, or by any other such source. The feedback may be reflective of how well the human agent interactions, the bot interactions (e.g., scripts), or a combination of the two functioned during the two-way communication.

As described above, in some implementations, the feedback module 831 obtains feedback from the user engaged in the conversation. For instance, at the end of a conversation, the feedback module 831 may transmit, to the network device utilized by a user, a request to provide feedback with regard to its conversation. In some implementations this is a verbal feedback as part of a transfer to a voice feedback system. In other implementations, this can be a written feedback provided via a web interface, a text interface, an application interface, or any other such feedback mechanism integrated with a computing system. This request may be provided in the form of a survey, through which the user may indicate its sentiment with regard to the conversation, as well as provide a performance evaluation of the bot and/or live agent. In some instances, the feedback module 831 may obtain feedback from the user engaged in the conversation during the conversation. For instance, the feedback module 831 may evaluate user responses during the conversation to determine the sentiment of the user, in addition to sentiment cues from a transcript. The feedback module 831 may analyze the textual or non-textual attributes associated with user messages to identify whether the user messages include an anchor associated with a polarity. As an illustrative example, if the user indicates, in a message, that it is "frustrated" or indicates that the proposed solution is incorrect (e.g., a "no" response, etc.), the feedback module 831 may determine that the message represents a negative polarity and, thus, determine that the bot failed to identify the intent and/or handle the request expressed by the user in a satisfactory manner. Such information from the transcript can be combined with direct survey input from the customer to generate a sentiment score, or separate automated and direct sentiment scores. Some systems may analyze and create separate correlations for expressed sentiment cues (e.g., that can be gathered from a communication in real-time to adjust script operation or agent suggestions in real-time during subsequent operations), as opposed to post-communication sentiment feedback that may not correlate directly to expressed sentiment cues. Machine learning engine 835 can additionally analyze transcript data to identify patterns that associate with low or high sentiment scores that can be identified in real-time from communication data in order to impact the real-time dynamic use of scripts.

The feedback used by feedback module 831 may be received in any suitable form. For example, the feedback may be expressed on a letter scale, on a number scale, through words, through selection of icons or graphics, and/or the like. The interface displayed to the agent and/or user to provide the feedback and to render the views of the conversation may be handled by the interface management system (e.g., the UI configuration engine 829) in conjunction with the processor 810.

The machine learning engine 835 may be configured to, in conjunction with the processor 810, accept data associated with the conversation, identified intent, automated bot actions, or other actions of communications and provided feedback (e.g. into a database) and analyze the data to draw inferences about how well the bot systems and/or live (e.g., human) agent handled the conversation. This data, along with other historical conversation data and feedback, may be used to build a model that may be used to determine a future intent associated with one or more future requests, and to update automated bot operations or flow (e.g. updating triggers, automated bot data gathering, automated bot communications to a customer, etc.). For example, if a particular action of an automated bot successfully handled an "order_status" intent to the satisfaction of a user, future "order_status" intents may also be managed by instances of the automated bot in future communications in the same way. In addition, future requests stating "I want my order status" may be automatically correlated with the "order_status" intent based on positive feedback. However, if a particular type of bot unsuccessfully handled an intent to the dissatisfaction of the user, future intents similar to the aforementioned intent may be transferred to a terminal device in order for these future intents to be handled by a live agent or to another type of bot that may be better suited to handle the intent based on a confidence score for the other type of bot and calculated based on the intent. Such negative feedback for the action can cause the automated systems (e.g., scripts) to not use the action in the future, or to use other actions first.

As an example, the first time a user contacts an agent with an intent of "delivery_status", automated operations may include use of a status function in real-time during the two-way communication (e.g., as part of the two-way communication). After the two-way communication is complete, a human agent that managed a portion of a communication may provide feedback on one or more aspects of the interaction, such as whether the order status function of a bot that interacted with a customer effectively resolved the user issue, whether or not the order status function of the bot was capable of resolving the intent, and the agents rating of how well the two-way communication proceeded when the order status bot was active. Further, the user may also provide feedback on similar or different aspects of the interaction, such as whether the order status function of the bot successfully resolved the user's intent, whether the order status bot was responsive to the user's messages, whether responses from the order status function of the bot were relevant to the intent and/or to the particular messages submitted by the user, and the like. Other techniques may be used to collect feedback regarding the interaction without explicit feedback from the agent and/or the user, such as by observing whether or not the agent had to intervene in the conversation during bot operation, which may indicate that the order status function of the bot was not effective. The feedback may be used to train a model in machine learning engine 835 that may be applied to future interactions. Such information may then be used to improve and manage functionality of a bot. Updated adjustment will then be used dynamically for future selection of bot functionality associated with the same or similar input data (e.g., input matching or associated with "delivery status" or a delivery status intent identified by NLU). Such a model applied and initiated for incoming or future interactions while the communication server 805 is managing other two-way communications, such that feedback and machine learning updates from feedback module 831 and machine learning engine 835 for one communication can be performed while the communication server 805 is managing two-way communications between users and human agents, and the updates can be dynamically applied to new communications in a communication server 805 while other communications proceed using the initial operations (e.g., not updated using feedback or machine learning updates).

In some implementations, communication server 805 can use issue determination engine 827 and UI configuration engine 829 to select an option switch between a bot (e.g., as part of bot engine 833) and interaction with a human agent dynamically and in real time (e.g., automatically) based on characteristics of the messages exchanged between the bot of bot engine 833. In some instances, voice messages provided from a user device to communication server 805 can be analyzed by bot engine 833 (e.g., following a voice to text conversion or other processes), to make an automated selection of scripts available to a system. Triggers or machine algorithms generated in conjunction with machine learning engine 835 can process a stream of data (e.g., voice data converted to text and processed by a neural network or other machine learning algorithm) to receive script recommendations or response selections. In some aspects, a bot engine 833 can interact with a customer via a decision tree.

User selections from the decision tree cause the bot engine 833 to provide a response. The machine learning engine 835 can use cues from customer inputs to modify or dynamically select between different customer selections of the same decision tree based on previous machine learning analysis of merged transcripts. Such an action can be based on operations of analyzing the text of a message to determine message characteristics (e.g., the message parameters) associated with customer inputs (e.g., voice communication or script tree selections), and can include an analysis of textual or non-textual attributes associated with the message. For example, bot engine 833 can extract natural language meaning from voice information provided to the bot engine 833 to determine that the current bot or script is not providing an adequate interaction with the customer, and can select a response to a customer operation dynamically based on the analysis. Such analysis can also automatically be used to transition a customer to a human agent, with human agent selection (e.g., from a pool of multiple human agents) based on the trigger (e.g., human agents with a history of success or skill in dealing with frustrated customers, or any other trigger used to initiate the transfer.) In some systems, when an automated ending to the bot interaction occurs based on a system trigger, a UI configuration engine can send a priority message to the human agent indicating the trigger that caused the automated transfer, to allow the human agent to be prepared to respond to problems involved with the bot or script that the customer has just finished interacting with.

Examples of triggers that can initiate a termination of bot functionality can include a string of text or voice to text data associated with a negative customer experience or polarity (e.g., sentiment or intent, with the words "frustrated" and "unhappy" corresponding to a negative polarity or frustrated polarity, the word "happy" corresponding to a positive polarity, and so on). Such terms can, in some implementations, be client specific for different systems (e.g., merchant systems) utilizing a communication server. For example, a term "dispute" for one client can be negative, but can be neutral or positive for a second client. In some instances, anchor terms or trigger terms can be dynamically determined using supervised machine learning techniques. For example, one or more clustering algorithms can be executed on stored messages to find patterns within the stored messages. The clustered messages can be further filtered and evaluated to determine the anchor. Further, one or more words near the identified anchor can be parsed for amplifiers. An example of an amplifier is a term that increases or decreases an intensity associated with the polarity of the anchor, such as "really," "not really," "kind of," and so on. The characteristic can include, for example, the speed of typing, the number of special characters used in the message (e.g., exclamation points, question marks, and so on), a semantic analysis of a message (e.g., by identifying keywords, sentence structures, repeated words, punctuation characters and/or non-article words); user input (e.g., having selected one or more categories); and/or message-associated statistics (e.g., response latency).

As a non-limiting example, the message parameter can be a numerical value that indicates the high intensity of the negative polarity (e.g., a message parameter of 20 on a scale of 0-100, with lower numbers indicating a negative polarity and higher numbers indicating a positive polarity). An algorithm can be used to calculate the message parameter. For example, the algorithm may be based on supervised machine learning techniques. In a further example, if the term "kind of" is near the anchor "don't like" (e.g., as in the sentence "I kind of don't like"), the term "kind of" may be identified as an amplifier term that indicates a medium intensity of the negative polarity. In this case, a message parameter can be generated based on the identification of the medium intensity of the negative polarity. As a non-limiting example, the message parameter can be a numerical value that indicates the medium intensity of the negative polarity (e.g., a message parameter of forty out of one hundred, as opposed to the message parameter of twenty). In some instances, the message parameter can be used to determine which secondary queue is to store the communication.

In some implementations, the characteristic of a message can be the sentiment associated with the message. The message parameter can represent the sentiment of the message. For example, if the sentiment of the message is happy, the message parameter can be a certain value or range of values, whereas, if the sentiment of the message is angry, the message parameter can be another value or range of values. Determining whether to terminate bot functionality can be continuously and automatically updated with each new message received at the communication server as part of a two-way communication while a bot is interacting with a customer.

In some implementations, the machine learning engine 835 may be used not only to manage algorithms associated with bot functionality or selection of different available scripts or responses to decision tree selections made by a customer (e.g., prioritization and/or use of functionality for different intent and sentiment scores for a given communication), but can also be used to select between different available human agents (e.g., based on human agent expertise or system scores associated with intents and sentiments for a given communications). In some aspects, a bot may be used to recommend and manage switching between human agents. In some implementations, a bot can automatically initiate and manage such a transfer between human agents. In other implementations, a bot can generate a transfer recommendation, and can use an interface management system (e.g., UI configuration engine 829) to recommend the transfer to the human agent associated with a given communication, allowing the human agent to initiate the transfer based on the bot recommendation. Such recommendations can be based on machine learning feedback and a machine learning algorithm that processes data received by the bot, or can operate as part of a bot. The machine learning model or artificial intelligence algorithm may be trained using feedback associated with previously conducted conversations between users and live agents. This feedback may be used to identify certain characteristics for each agent. These characteristics may include, but are not limited to, areas of expertise associated with technical issues, responsiveness to particular sentiments (e.g., ability to reduce user frustration or anger, etc.), response latency, user satisfaction rating or score, and the like. If a bot terminates interactions with a customer due to a trigger (e.g., a sentiment score reaching a threshold level), the communication system may use the machine learning model or artificial intelligence algorithm to select a particular agent that may intervene in the conversation and provide an increased likelihood of a positive user experience. In some implementations, sentiment scores may be based not only on cues such as specific word choices, but can also be based on tonality of a verbal communication for voice communications. In video communications, image analysis of facial expressions and body language may also be used to generate sentiment scores.

In some implementations, the communication server 805 uses feedback from the network device (e.g., customer device) in feedback module 831 to train or update the machine learning model or artificial intelligence algorithm used to select an agent for intervention in a conversation between a network device and a bot. For instance, if the network device provides feedback indicating a negative experience with the selected agent, the communication server may update the machine learning model or artificial intelligence algorithm to reduce the likelihood of the agent's selection for a conversation having identical or similar characteristics to the conversation associated with the received feedback. Alternatively, if the network device provides feedback indicating a positive experience with the selected agent, the communication server may update the machine learning model or artificial intelligence algorithm to further reinforce the agent's ability to positively address identical or similar conversations.

Figure 9:
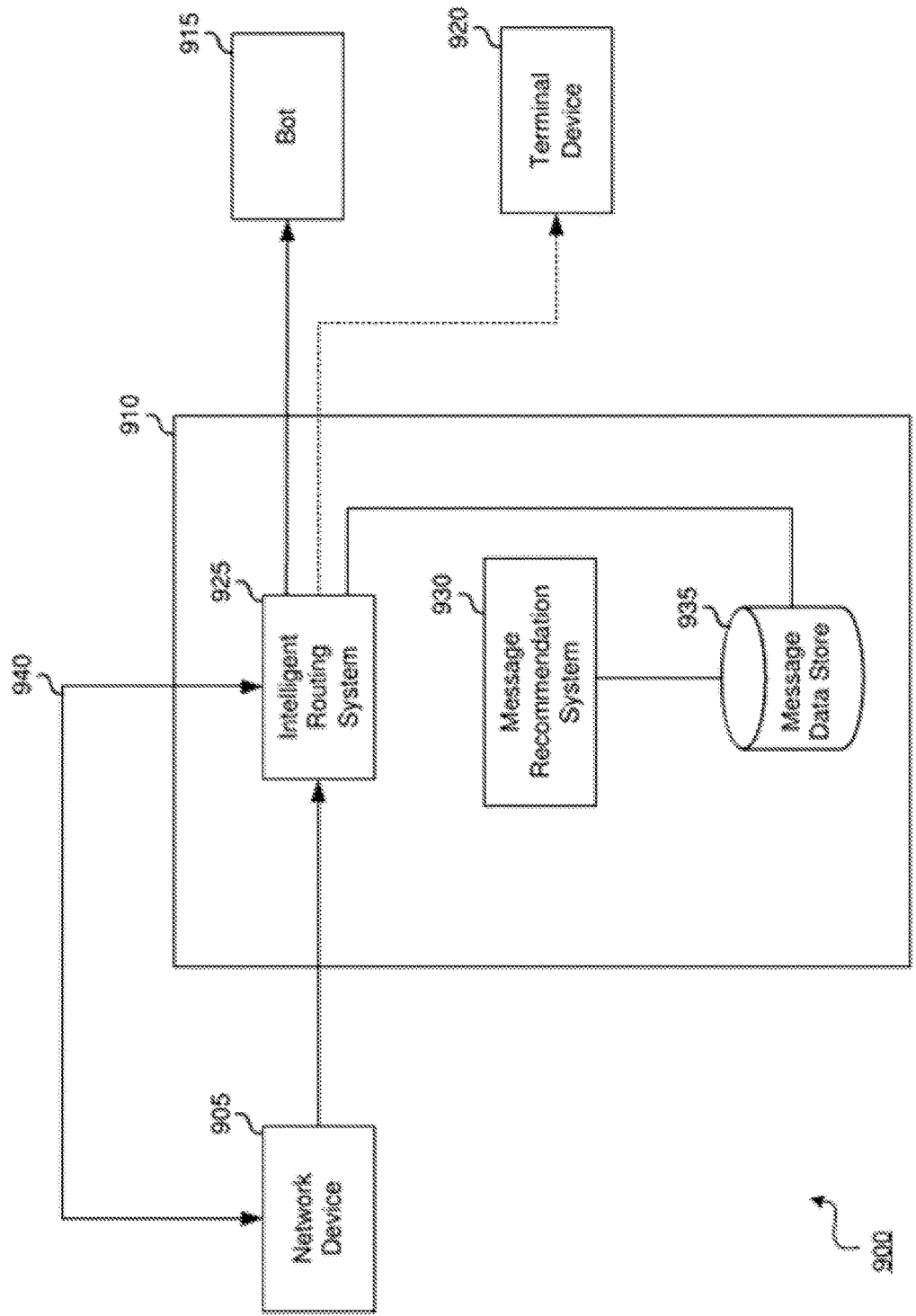
FIG. 9 shows a block diagram representing a network environment for feedback using machine-learning techniques in accordance with examples described herein.

FIG. 9 shows a block diagram representing network environment 900 for enhancing endpoint selection (e.g., selection of a particular human agent, or determination of whether to use a human agent or bot interaction.) using machine-learning techniques. Network environment 900 may include network device 905 (operated by a user) communication server 910, bot 915 and terminal device 920. Communication server 910 can facilitate the establishment of a communication channel that enables network device 905 and at least one bot 915 and terminal device 920 to communicate.

Communication server 910 may include intelligent routing system 925, message recommendation system 930, and message data store 935. In such a system, intelligent routing system 925 can include analysis of initial or existing data associated with a communication to select bot functionality or a particular human agent from a human agent pool to be used for a given two-way communication. Each of intelligent routing system 925 and message recommendation system 930 may include one or more computing devices with a processor and a memory that execute instructions to implement certain operations. Intelligent routing system 925 may include one or more processors configured to execute code that causes one or more machine-learning techniques or artificial intelligence techniques to provide dynamic feedback for selection of bot functionality as part of communication operations in conjunction with real-time intelligent routing of messages. In some implementations, intelligent routing system 925 can execute one or more machine-learning techniques to train a model that predicts whether a message received from network device 905 may be successfully addressed by a bot 915.

As a non-limiting example, intelligent routing system 925 may receive a message from network device 905 through a communication channel established or facilitated by communication server 910 (e.g., a native application configured to enable users to communicate with each other across various devices). Intelligent routing system 925 may evaluate the incoming message according to certain embodiments described above (e.g., intent and/or sentiment scoring). For example, intelligent routing system 925 may evaluate the content (e.g., text, audio clips, images, emoticons, or other suitable content) included in the received message using a trained machine-learning model to identify an intent and/or a sentiment. The input data (e.g., communication text and/or intent data) can be analyzed to determine whether to use an initial bot or script functionality, or to direct the initial contact to a given human agent. For example, communications with a low sentiment score (e.g., indicating frustration), can be routed to a human agent specializing in addressing low-sentiment score communications. The determination made by the system 925 is used to direct the communication. Data from the intelligent routing can be stored in message data store 935 and integrated with various feedback systems using message recommendation system 930.

In some implementations, intelligent routing system 925 may request an acknowledgement from network device 905 of the predicted destination. As a non-limiting example, intelligent routing system 925 may evaluate the message using a machine-learning technique, and a result of the evaluation may include a prediction that bot 915 is the destination for the message. To confirm, intelligent routing system 925 may automatically request feedback signal 940. For example, feedback signal 940 may include a request for network device 905 to acknowledge whether bot 915 is the correct destination for the message (e.g., "Is Technical Support the correct destination?"). If network device 905 transmits the acknowledgement that bot 915 is the correct destination (e.g., the destination intended by the user operating network device 905), then intelligent routing system 925 may train the machine-learning model to predict that future messages including the exact or similar content (e.g., a threshold of similarity, such as 10 percent difference in content) as the received message are to be routed to bot 915. However, if intelligent routing system 925 receives feedback signal 940 indicating that bot 915 is not the correct or intended destination for the received message, but rather terminal device 920 is the correct or intended destination, intelligent routing system 925 can train the machine-learning model that future messages including the exact or similar content as the received message are to be routed to terminal device 920 (instead of bot 915). In some implementations, intelligent routing system 925 may not immediately update or train the machine-learning model to route future messages to terminal device 920, but rather, intelligent routing system 925 may wait for a threshold number of incorrect routings to bot 915 before routing all future messages with the exact same or similar content as the received message to terminal device 920.

Message data store 935 may store some or all messages received in the past from one or more network devices. Further, message data store 935 may also store some or all messages transmitted by terminal devices or bots during previous communication sessions with network devices. Message data store 935 may also store some or all messages transmitted by network devices to bots during communication sessions. Further, message data store 935 may store some or all messages transmitted by bots to network devices during communication sessions. In some implementations, message data store 935 may be a database of all messages processed (e.g., transmitted by or received at) communication server 910.

Message recommendation system 930 may analyze the database of messages stored at message data store 935. In some implementations, message recommendation system 930 may evaluate the messages stored at message data store 935 using one or more machine-learning algorithms or artificial intelligence algorithms. For example, message recommendation system 930 may execute one or more clustering algorithms, such as K-means clustering, means-shift clustering, Density-Based Spatial Clustering of Applications with Noise (DBSCAN) clustering, Expectation-Maximization (EM) Clustering using Gaussian Mixture Models (GMM), and other suitable machine-learning algorithms, on the database of messages stored in message data store 935. In some implementations, a recurrent neural network (RNN) or a convolutional neural network (CNN) may be used to predict response messages to assist the agent. In some implementations, message recommendation system 930 may use support vector machines (SVM), supervised, semi-supervised, ensemble techniques, or unsupervised machine-learning techniques to evaluate all previous messages to predict responses to incoming messages received from network devices during communication sessions. For example, message recommendation system 930 may evaluate the content of messages received from network devices (or messages received at communication server 910 from bots or terminal devices) and compare the results of the evaluation to the one or more clusters of previous messages stored in message data store 935. Once the cluster is identified, message recommendation system 930 can identify the most relevant response messages based on a confidence threshold. For example, an incoming message (e.g., received at communication server 910 from network device 905) may correspond to a technical issue based on the content of the incoming message. Message recommendation system 930 can identify that the incoming message corresponds to a technical issue based on an evaluation of the content of the incoming message (e.g., text evaluation). Message recommendation system 930 can access message data store 935 to identify the cluster of messages associated with technical issues. Message recommendation system 930 can select one or more response messages within the cluster of messages based on a confidence threshold. As a non-limiting example, a confidence algorithm can be executed to generate a confidence score. A confidence score may be a percentage value where the lower the percentage, the less likely the response is a good prediction for the incoming message, and the higher the percentage, the more likely the response is a good prediction for the incoming message. A minimum confidence threshold may be defined as a measure of certainty or trustworthiness associated with each discovered pattern. Further, an example of a confidence algorithm may be the Apriori Algorithm, similarity algorithms indicating similarity between two data sets, and other suitable confidence algorithms. Such functionality can be included in bot functionality or other system operations, for example, in an initial analysis of a communication that can be performed by a bot as a communication session is established, or at selected points in a communication.

FIG. 10 is an illustration of aspects of a two-way communication segment 1000 that can be used in accordance with examples described herein. FIG. 10 shows an interface displaying communication segments that can be part of a two-way communication. As illustrated, a customer, labeled as "visitor", initiates a two-way communication with an initial verbal communication "Hi". In some systems, the system may have a phone number that provides additional information, or an initial bot may request information, so that a transcript of the communication may include additional identifying information. In other systems, an initial communication from a customer may be abstract, with no other information than the voice of the customer as illustrated in communication 1000. In other systems including video data (e.g., a video call or networked video conference), video data may be used along with voice or any other data. In some such systems, video, text, and voice may all be used and included in a transcript that can be analyzed for automated script generation as described herein.

The communication segment 1000 can be a communication between a human agent or a non-human agent. A non-human agent that uses natural language processing may respond to a vague initial customer interaction with a generic prompt for more information. In some systems, a set of decisions can be communicated as part of a script. Other systems, or a human agent system may proceed with an abstract request for more information, such as the illustrated "how can I help you?" of communication segment 1000. The customer then provides information that can be associated with two separate customer issues. Language 1010 can be associated with an "order status" customer issue (e.g., checking on an existing order). Language 1020 can be associated with a "product return" customer issue. Such issues can be identified automatically as part of bot interactions, or can be selected by a human agent that enters an issue identifier via an interface.

In a speech communication, the transcript can be generated automatically via speech to text systems, and the information of communication 1000 can be stored as part of a transcript segment that is merged with other transcript segments. Such a merged transcript can include significant additional information, besides just the language of the communication.

Figure 11:
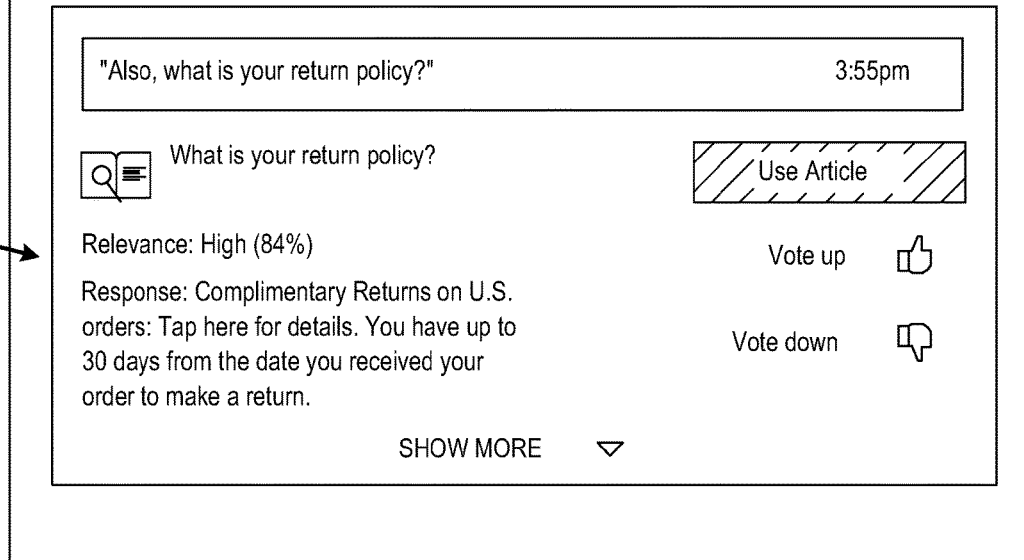
FIG. 11 is an illustration of aspects of a two-way communication that can be used in accordance with examples described herein.

FIG. 11 is an illustration of aspects of a two-way communication that can be used in accordance with examples described herein. The interface 1100 illustrates an interface that can be presented to a human agent as part of a communication associated with communication segment 1000 of FIG. 10. As described above, a transcript may include not only text of a voice or text communication, voice, video, or other such data directly pulled from customer interactions, but also details of bots, scripts, or other system tools used or considered to facilitate resolution of a customer issue. In communication segment 1000, language 1010 is associated with a product return issue, and an automated bot system or analysis system (e.g., an interaction management engine 625), can recommend a bot specifically tailored for such an issue. The interface 1100 can be a recommendation in an interface element 1110 for a human agent, or can be a transcript record of a transfer of the communication to an orderBot to automatically resolve the customer issue. Similarly, interface element 1120 is associated with language 1020. The interface element 1120 may be a script element that can automatically be presented to a customer when a customer issue is automatically identified by NLP of the customer provided language 1020.

A merged transcript can take the text of human agent interactions, text and other relevant information from bot interactions, system operation details (e.g., bot relevance scores, resolution scores, feedback, etc.), and store the shared information in a merged transcript.

As part of system operations, an initial system status can direct all customers to human agents, or to an initial set of scripts. In one example, communication segment 1000 is a transcript of a human agent interaction with a customer. The human agent can identify the orderBot bot resources as a possible mechanism for resolving a customer issue, and can use that tool to resolve the customer issue. After completion of the communication, the merged transcript (e.g., including details of the human agent communications with the customer, as well as details of orderBot operation), can be included in the transcript. The transcript can thus include not only text from words exchanged between the customer and the human agent, but also details of the human agent interaction with a bot resource.

Automated analysis of the merged transcript and other merged transcripts may identify that human agents frequently respond to customer "order status" issues using the orderBot. Such analysis may determine that a script allowing customers to directly interact with the orderBot can provide equivalent customer issue resolution. An automated script may be generated to present an option to the customer to interact with the orderBot, rather than having the human agent interact with the orderBot. In operation, an automated script can then be used to transfer the customer to an orderBot interface. Feedback systems can then be used with such an automatically generated script to analyze performance. If feedback indicates that customers experience difficulty with the orderBot, the feedback may suggest that client (e.g., merchant) metrics are met more effectively when a human agent interacts with the orderBot rather than automated customer interaction.

Similarly, communication segment 1000 includes language 1020 associated with a return policy. Many interactions between human agents and customers requesting return policy information may identify that customers typically are interested in a specific subset of information from a merchant return policy. Automated analysis of the transcripts can identify the subset of return policy information, and automate a script to provide this information to customers in response to certain trigger inputs. Different human agents may respond to return policy information in different ways. Transcripts can record these different responses, and feedback information analyzed by a machine learning system can be grouped and associated with different outcomes. One set of agents may simply refer to the complete return policy, providing a link to the complete text. Other agents may provide a simplified summary of a specific portion of the return policy. The machine learning analysis may determine that certain types of customer requests received better resolution scores when a subset or summary of the return language is provided to the customer. With sufficient input data (e.g., achieving a threshold success or positive resolution score), a system as described herein can automatically select summary language from transcripts and generate an automated script to allow a bot to provide a summary of return policy language, with an option to request more information. In some instances, the language in the script may not be a quote of the return policy, but may be language created by a human agent and stored in a transcript that, when used in repeated customer communications, produces positive resolution results. The transcript information can be adopted into an automated script based on machine learning analysis (e.g., training of a neural network using transcripts as training data). In some systems, transcript data from a database is used as training data for a neural network, and a generated script can be used if the neural network has sufficient positive metrics associated with the script. Such positive associated metrics can include similar language occurring a threshold number of times in communications having positive issue resolution feedback, as well as a threshold confidence (e.g., probability score) identified by system operation.

In some systems, rather than automated generation of a script including the summary of the return policy that is automatically integrated into system operation, the script can be automatically generated and presented to a script manager or a merchant manager for review and approval. Such an automated script can then be modified or verified by the script manager to confirm that the script meets merchant preferences and system goals, and the script manager can use a UI interface to review the automatically generated script and approve integration of the script with system operation.

After the script is integrated into system operation, the transcripts using the script can be reviewed to verify that the script achieves expected results in system operation. In some systems, the operation of newly integrated automatically generated scripts can be closely tracked, with separate use thresholds. If certain events occur, such as a threshold number of communications involving the script that receive negative results scores or negative sentiment scores, the script may be automatically removed from bot use, or a message may be generated for a script manager to review metrics associated with use of the automated script. In some such examples, the script may be recommended for use by human agents (e.g., presented as a recommended script in a human agent interface, but not presented by a non-human agent using a voice recording or machine voice).

Human agent interactions included in merged transcripts can be used by a system to automatically generate customized script responses that can be integrated with bot operations for events that occur infrequently. For example, a system may receive a niche request for a customer issue on a rare occasion, but the human agents may have 100% success with a simply automatable response (e.g., a simple text or spoken response). Such criteria may be used to generate a machine voice version of the human agent response that can be provided when the niche customer issue is identified by bot system interactions with a user. Bot systems can then provide quick and effective responses, rather than the system having a customer wait for a human agent, and have the human agent research the niche issue. Further, the bot systems may identify characteristics of a customer that allow not only an immediate automated response to a niche customer issue, but may also allow the bot system to present the information to the customer in a manner likely to achieve positive sentiment results.

FIG. 11, as discussed above, illustrates an interface that can be used with an agent device to recommend assistance tools, scripts for use by a human agent, transfer to a bot or another human agent, or other such actions. In some implementations, a bot engine (e.g., the bot engine 833) operating to facilitate a human agent interaction may recommend or predict responses to messages received from network device that can be used by a human agent to respond to a customer communication. Such a recommendation can occur in real-time dynamically with the agent device automatically performing NLP on a customer voice communication (e.g., or any combination of voice, text, and video from a two-way communication), and presenting recommendations on a display of the human agent device. For example, the interface management system 837 may cause an agent interface to display a history of interactions between a bot or script and a customer device, and may recommend actions to be taken by a human agent that relate to or build on previous bot interactions, while also avoiding duplicate actions or redundant transfers of a customer that can increase customer frustration. The operations of the agent device can include interface options presented on an agent device to allow triggering of additional bot functionality (e.g., initiating a transfer to a bot or calling a bot to assist the human agent, such as bots for accessing automated assistance data, scheduling functionality, transfer functionality, etc.). Such operations can be performed by a communication server 805, with a UI configuration engine 829 used to present related interface elements on an agent display, and where a machine learning engine 835 can be used with feedback module 831 to analyze the efficacy of recommended actions, and alter the future use of such recommendations in existing two-way communications or future two-way communications using system feedback.

Figure 12:
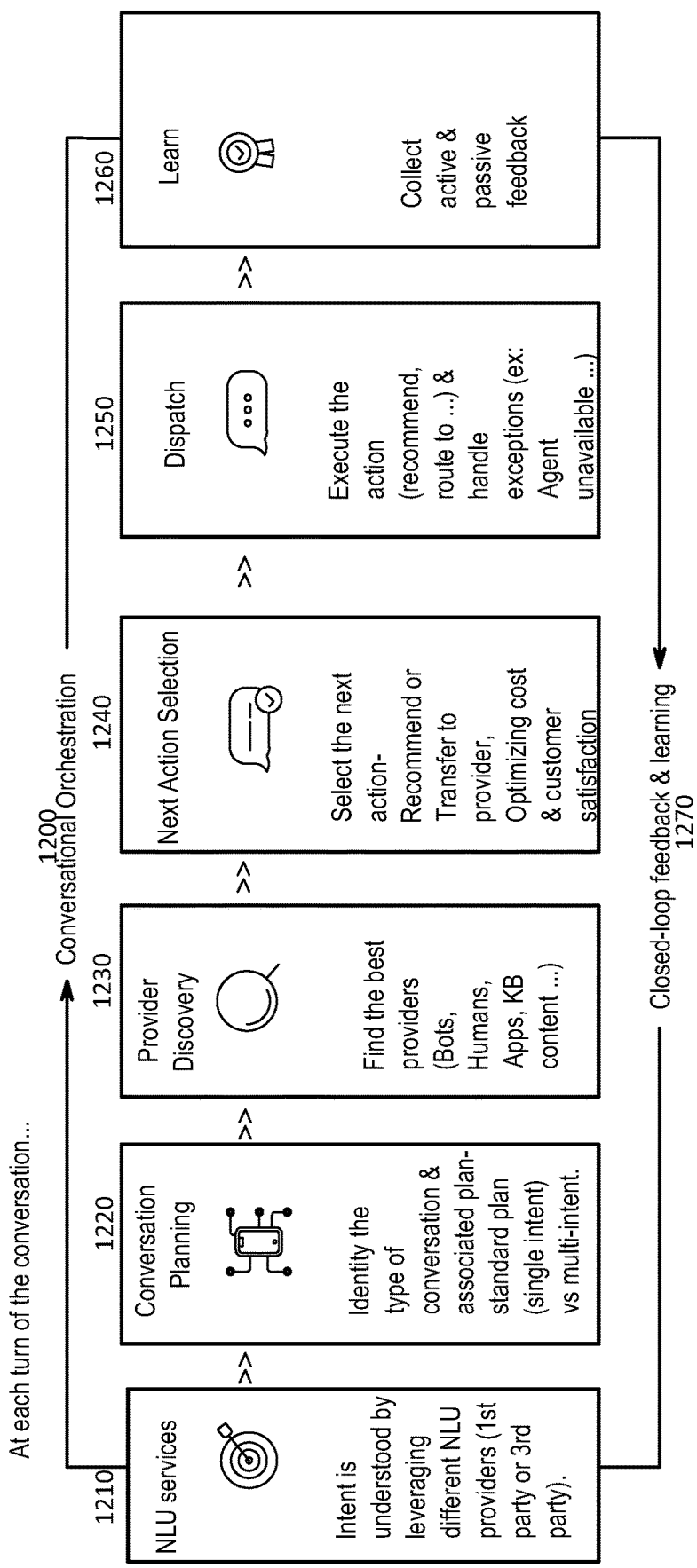
FIG. 12 illustrates aspects of a two-way communication session and associated input data used for merged transcripts in accordance with examples described herein.

FIG. 12 illustrates aspects of a two-way communication session and associated input data in accordance with examples described herein. FIG. 12 illustrates aspects of bot operation and feedback (e.g., using machine learning with feedback) to improve communication results in accordance with aspects described herein. In the chart of FIG. 12, input data 1210 (e.g., a user input as part of a two-way communication) is received. In some examples, the user input is voice data that can be analyzed with natural language processing (NLP), and that can be converted to test to be stored in a transcript segment. In some examples, different transcript types (e.g., audio, text, etc.) can be generated by different systems used by a communication system. In some examples, a standard interface or initial interaction menu (e.g., verbal instructions requesting a verbal or number response to direct a next action) are used. Depending on the particular implementation, a direct response or a set of options can be processed by a system. For a menu tree (e.g., options 1 through N provided via an instruction communication), a menu response or path selection can be received in operation 1220 and followed, with conversation orchestration 1200 (e.g., feedback and analysis) performed for a selected conversation turn, which may be in real-time, at a given state of a communication, or after completion of the communication. For a natural language input from a customer, a plurality of bot operations 1220 can be queried for confidence scores. When the confidence scores are received, they are used to generate a table or analysis of comparative scores 1230. In operation 1240, the comparative scores are analyzed and used to select a next action (e.g., use of a script element or action from a path responsive to a customer selection), which can be selected from different possible options in accordance with system intelligence. In operation 1250, the selected action is executed. Information about communication operations are gathered in operation 1260, and then used to facilitate the two-way communication. The facilitation can involve redirecting the two-way communication to the selected bot function, terminating bot operations (e.g., transferring to a human agent) or other such operations. Information from transcripts can be gathered in real-time during the two-way communication to be used for machine learning or other feedback mechanisms in operation 1270 to update the scripts or bot operations in future instances of similar communications. The feedback information can include metadata, surveys, or analysis of the data in the two-way communication.

In some aspects input data for each turn (e.g., conversation orchestration 1200) results in a set of conversation orchestration operations. Input data for a turn is initially processed by NLU services. Such NLU services can identify intent values, keywords, or other such input data. Intent values can be generated by leveraging one or more NLU services, including local NLU or remote NLU services. Such NLU analysis is performed in real-time or near real-time, such that an NLU analysis for one turn can be in processes when another turn occurs, and the additional turn can be integrated with an in process NLU analysis for the two-way communication, or an additional NLU analysis can occur for the new turn in real-time. NLU data (e.g., intent values) is then used in conversation planning. Conversation planning can use the NLU data from NLU services to identify a conversation "type" or a response plan. Additionally, conversation planning can identify a multi-intent two-way communication (e.g., where a user wants to both schedule a new appointment and receive a list of previously made appointments, or take any such plurality of different actions which may use different system services such as multiple different bots). Conversation planning may identify a script from an initial intent identified by NLU services or an initial bot to manage gathering of additional information or support to facilitate the two-way communication. Details of conversation planning can be included in transcripts, and used to adjust or alter system operations, particularly for sets of operations or responses that produce positive results (e.g., to be emphasized) and those that produce negative results (e.g., to be removed from system use).

Feature discovery can then be dynamically performed to identify the best resources for the two-way communication based on the conversation planning and NLU data from NLU services. Feature discovery can include the operations described above to identify features of a bot for use based on existing sentiment, intent, human agent selection, or other such data for a communication. Feature discovery can additionally compare the identified bot features with additional options, such as human agents associated with the NLU data (e.g., agents with specialized information associated with an intent), non-bot applications that may facilitate the two-way communication, informational content for an agent or customer, or other such data. Various criteria may be used to determine when to provide non-bot resources to a customer rather than identified bot features.

Resources used by a bot can be executed in dispatch operations. The dispatch operations can include routing a customer to a connection with a selected feature, providing identified information to a customer, requesting information from a customer, performing voice-to-text or text-to-voice services for communications to a human agent, or any other such actions. Operations from NLU services can occur dynamically in real-time, which includes multiple such threads occurring simultaneously if a user takes multiple turns (e.g., provides multiple NLU responses, such as requesting multiple options from the possible services, such as scheduling, purchase assistance, product troubleshooting, etc.). Conversation planning can, for example, manage presentation of multiple different resources in a multi-intent communication, as well as managing feedback on resources used in a communication (e.g., re-planning when a user provides negative feedback on a dispatched bot). The real-time nature of the conversation orchestration allows a customer to receive responses quickly as part of a two-way communication, and the dynamic nature allows the conversation orchestration to adapt or respond to multiple turns from a customer in the two-way communication during bot operations. Features identified through feature discovery can provide efficient responses to standard customer requests, and dynamic analysis with NLU services during bot interactions. Feedback and machine learning analysis of system operation can be used to improve the efficiency of a system and the quality of information and services provided to a customer.

Learning operations can collect active and passive feedback from each turn of conversation orchestration 1200, as well as aggregated data (e.g., text, metadata, agent analysis, customer polling data, etc.) for system operation. As described above, such information can be used by the system to improve each step of conversation orchestration 1200. Examples described herein particularly use feedback from learning operations using transcript data. For systems using real-time integration of transcript information, real-time feedback allows data from a first two-way communication to inform the selection of bot functionality in a second two-way communication that is occurring at the same time as the first two-way communication. As soon as feedback from the first two-way communication is received, the selection process (e.g., mapping, scores, etc.) can be updated to reflect the feedback, and to provide the bot feature selection criteria for the second two-way communication if an associated input is received that analyzes the same communication details (e.g., intent, sentiment, history data, etc.) in a discovery operation for a turn of the second two-way communication. Such information can additionally be used for modification of script details, altering script usage criteria, or any other such feedback that can be dynamically integrated or adjusted based on feedback captured in communication transcripts.

Figure 13:
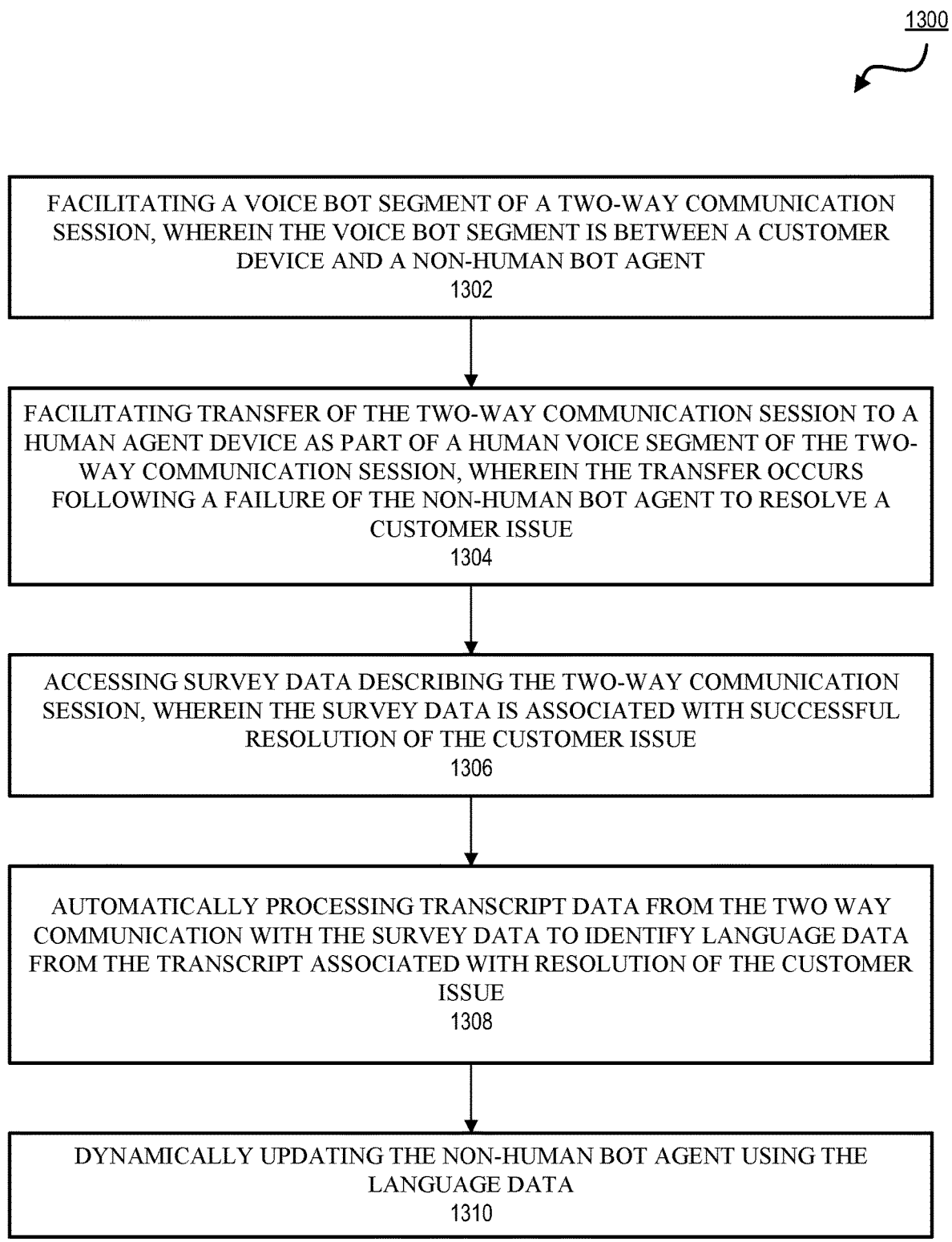
FIG. 13 is a flowchart illustrating a method in accordance with some aspects described herein.

FIG. 13 is a flowchart of a method 1300 for operation of a communication system in accordance with examples described herein. Method 1300 can be implemented by any device participating in a two-way communication, such as a connection management system 150 or 450, an interaction management engine 625, a communication server 805, or any other such device including a memory and one or more processors configured to perform method 1300. In some examples, an agent terminal or user device can integrate the functionality for method 1300. In some examples, method 1300 is implemented as instructions stored in a non-transitory computer readable medium that, when executed by one or more processors of a device, cause the device to perform operations comprising method 1300.

Method 1300 includes block 1302 describing operations for facilitating a voice bot segment of a two-way communication session, where the voice bot segment is between a customer device and a non-human bot agent. In some systems, a two-way communication system can include various systems that route a customer between human agents and non-human agents (e.g., transferring to a bot agent after a previous contact with one or more human or prior bot agents).

Block 1304 describes operations for facilitating transfer of the two-way communication session to a human agent device as part of a human voice segment of the two-way communication session, where the transfer occurs following a failure of the non-human bot agent to resolve a customer issue. Such a failure can be identified by customer feedback or selection of a request to transfer to a human agent, real-time dynamic analysis of customer sentiment associated with a bot interaction, or any other such mechanism described herein.

Block 1306 describes operations for accessing survey data describing the two-way communication session, where the survey data is associated with successful resolution of the customer issue. The survey data can include direct customer feedback (e.g., from a post communication question and response interaction), identification of an indirect action following the two-way communication session (e.g., purchase of an item, or identification of third party review feedback associated with the interaction or customer from an independent source).

Block 1308 describes operations for automatically processing transcript data from the two-way communication with the survey data to identify language data from the transcript associated with resolution of the customer issue. Such operations can include natural-language systems, custom bot integration systems, or other mechanisms for identifying interaction data that can be integrated into an automated bot system.

Block 1310 describes operations for dynamically updating the non-human bot agent using the language data. For example, natural language data identified in block 1308 can be integrated into a decision tree or script associated with a bot or non-human agent system. Such data can be structured as a direct script, or as an abstract interaction guide that can be used by a bot to respond to subsequent similar interactions with a customer. Such abstract interaction guides can, for example, be used by a language interface to provide a response outline for bots operating in different languages based on a language preferred by a customer. In other implementations, any other such mechanism described for non-human agent systems or interactions can be updated using transcript data generated in the blocks above to improve the functionality of the bot.

Figure 14:
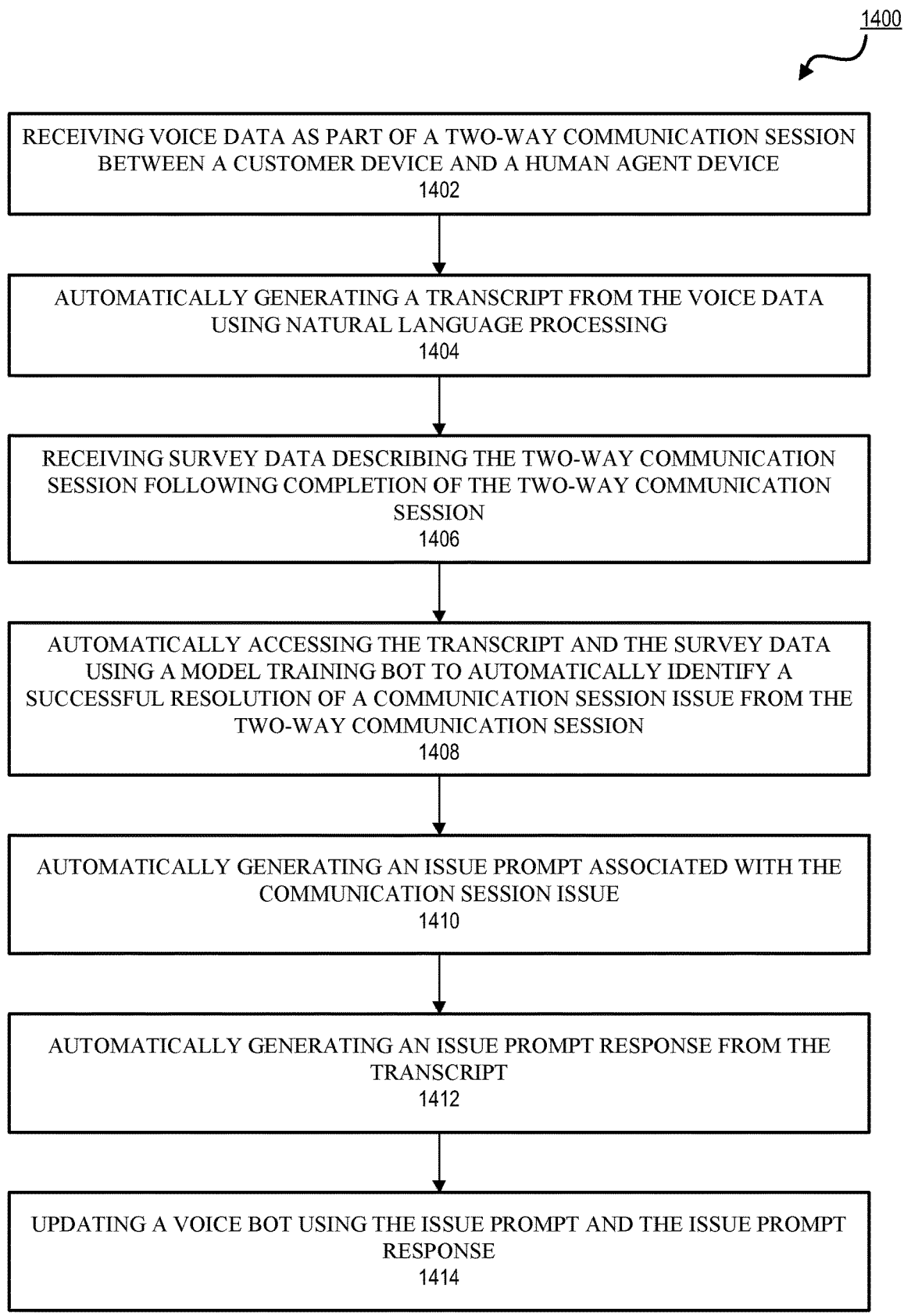
FIG. 14 is a flowchart illustrating another method in accordance with some aspects described herein.

FIG. 14 is a flowchart of a method 1400. Method 1400 may be implemented in any manner as described above for method 1300.

Method 1400 includes block 1402, which describes an operation of receiving voice data as part of a two-way communication session between a customer device and a human agent device. While the method 1400 specifically describes the use of voice data, in other implementations, any combination of voice data, text data, or any other such communication can be used for transcript generation as described herein. Additionally, some implementations can use multiple sources for transcript data, such as when a two-way communication transitions from voice communications to text communications, or is interrupted and resumes, with separate recordings or device sources used before and after the interruption.

Block 1404 describes an operation of automatically generating a transcript from the voice data using natural language processing. Block 1406 describes an operation of receiving survey data describing the two-way communication session following completion of the two-way communication session. Block 1408 describes an operation of automatically accessing the transcript and the survey data using a model training bot to automatically identify a successful resolution of a communication session issue from the two-way communication session. Block 1410 describes an operation of automatically generating an issue prompt associated with the communication session issue. Block 1412 describes an operation of automatically generating an issue prompt response from the transcript. Block 1414 describes an operation of updating a voice bot using the issue prompt and the issue prompt response. Such issue prompts can, for example, be identified by a client. The client can select particular issues for analysis and expansion within a given bot associated with the client. Based on such a selection, additional analysis of communication data can be performed to flag communications associated with a client identified issue. Customers of the client engaged in interactions with a client-specific bot can provide data that is stored as a transcript, and analyzed for issue specific interactions with a human agent. Such client-identified issues can then be analyzed and used to improve the client specific bots.

FIG. 15 is a flowchart of a method 1500. Method 1500 may be implemented in any manner described above, including instructions in a storage medium, configuration for processors in a device, or any other such aspect.

Method 1500 includes block 1502, describing an operation for accessing a merged transcript for the two-way communication session associated with a voice bot, where the merged transcript comprises a text transcript of a voice bot segment, a text transcript of a human voice segment, and survey data describing the two-way communication session. Block 1504 describes an operation of automatically processing the merged transcript to identify a customer issue and language data associated with resolution of the customer issue. Block 1506 describes an operation of dynamically updating the voice bot to include the language data and a bot prompt associated with the customer issue and the language data.

Figure 16:
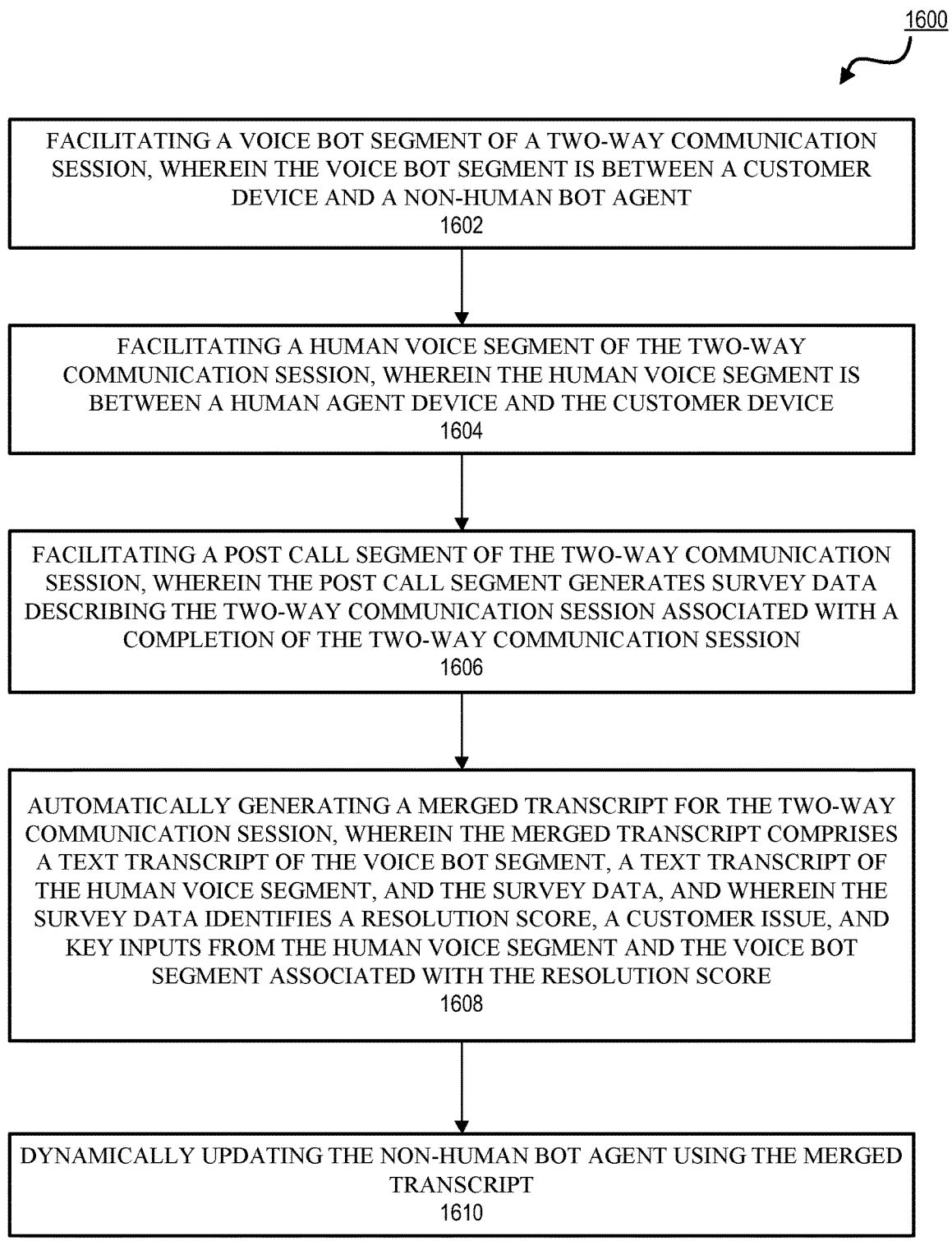
FIG. 16 is a flowchart illustrating another method in accordance with some aspects described herein.

FIG. 16 is a flowchart of a method 1600. Method 1600 may be implemented in any manner described above, including instructions in a storage medium, configuration for processors in a device, or any other such aspect.

Method 1600 includes block 1602, describing an operation for facilitating a voice bot segment of a two-way communication session, where the voice bot segment is between a customer device and a non-human bot agent. Block 1604 describes an operation for facilitating a human voice segment of the two-way communication session, where the human voice segment is between a human agent device and the customer device. Block 1606 describes an operation for facilitating a post call segment of the two-way communication session, where the post call segment generates survey data describing the two-way communication session associated with a completion of the two-way communication session. Block 1608 describes an operation for automatically generating a merged transcript for the two-way communication session, where the merged transcript comprises a text transcript of the voice bot segment, a text transcript of the human voice segment, and the survey data, and where the survey data identifies a resolution score, a customer issue, and key inputs from the human voice segment and the voice bot segment associated with the resolution score. Block 1610 describes an operation for dynamically updating the non-human bot agent using the merged transcript.

FIG. 17 is a flowchart of a method 1700. Method 1700 may be implemented in any manner described above, including instructions in a storage medium, configuration for processors in a device, or any other such aspect.

Method 1700 includes block 1702, describing an operation for accessing a plurality of merged transcripts for a plurality of two-way communication sessions associated with a voice bot, where each merged transcript of the plurality of merged transcripts comprises a text transcript of a voice bot segment, a text transcript of a human voice segment, and survey data describing the two-way communication sessions. Block 1704 describes an operation of automatically processing the plurality of merged transcripts to identify a customer issue and language data associated with resolution of the customer issue. Block 1706 describes an operation of dynamically generating a user interface comprising source information from the plurality of merged transcripts for the language data associated with resolution of the customer issue.

Figure 18:
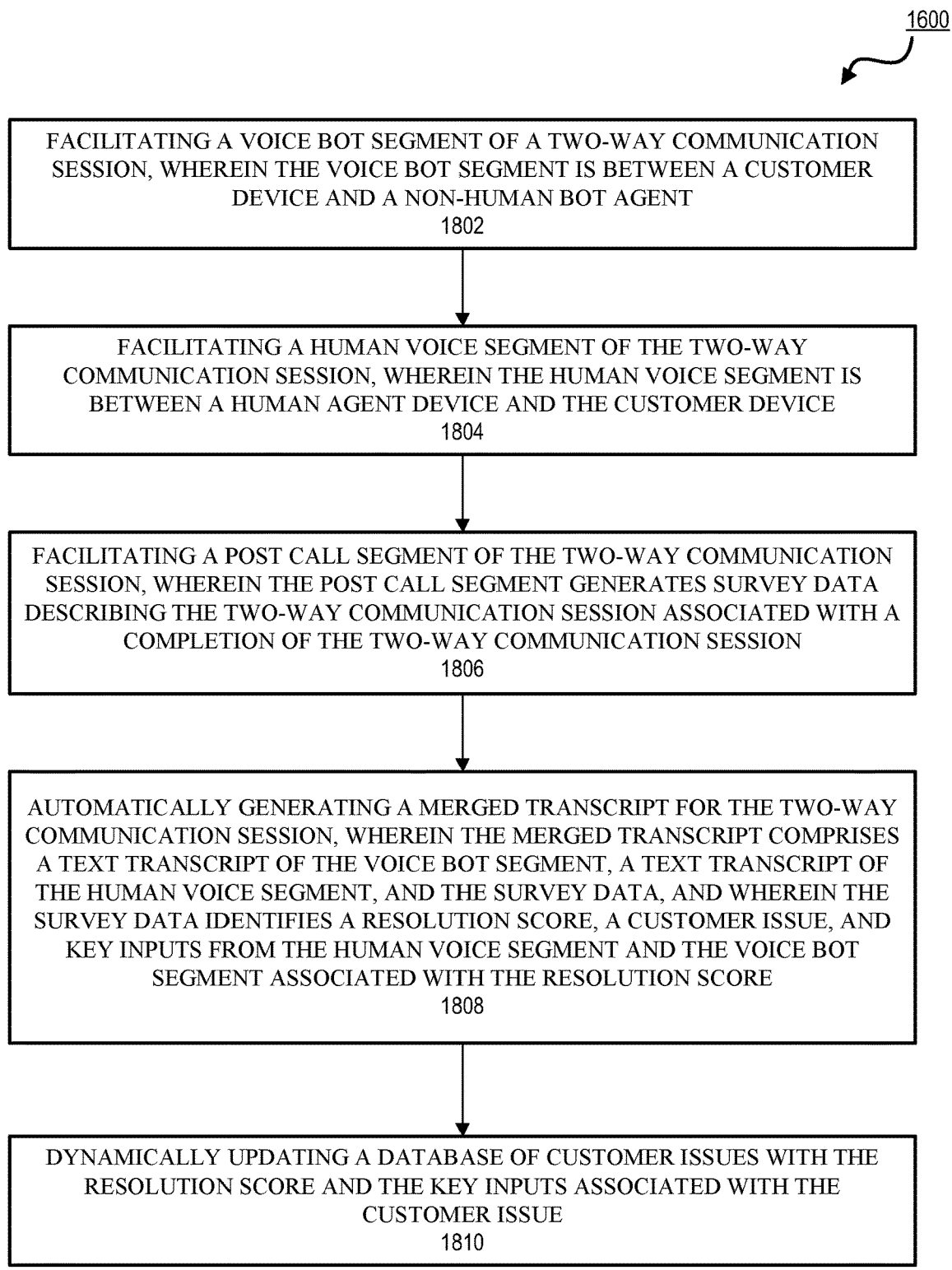
FIG. 18 is a flowchart illustrating another method in accordance with some aspects described herein.

FIG. 18 is a flowchart of a method 1800. Method 1800 may be implemented in any manner described above, including instructions in a storage medium, configuration for processors in a device, or any other such aspect.

Method 1800 includes block 1802, describing an operation for facilitating a voice bot segment of a two-way communication session, where the voice bot segment is between a customer device and a non-human bot agent. Block 1804 describes an operation of facilitating a human voice segment of the two-way communication session, where the human voice segment is between a human agent device and the customer device. Block 1806 describes an operation of facilitating a post call segment of the two-way communication session, where the post call segment generates survey data describing the two-way communication session associated with a completion of the two-way communication session. Block 1808 describes an operation of automatically generating a merged transcript for the two-way communication session, where the merged transcript comprises a text transcript of the voice bot segment, a text transcript of the human voice segment, and the survey data, and where the survey data identifies a resolution score, a customer issue, and key inputs from the human voice segment and the voice bot segment associated with the resolution score. Block 1810 describes an operation of dynamically updating a database of customer issues with the resolution score and the key inputs associated with the customer issue.

Figure 19:
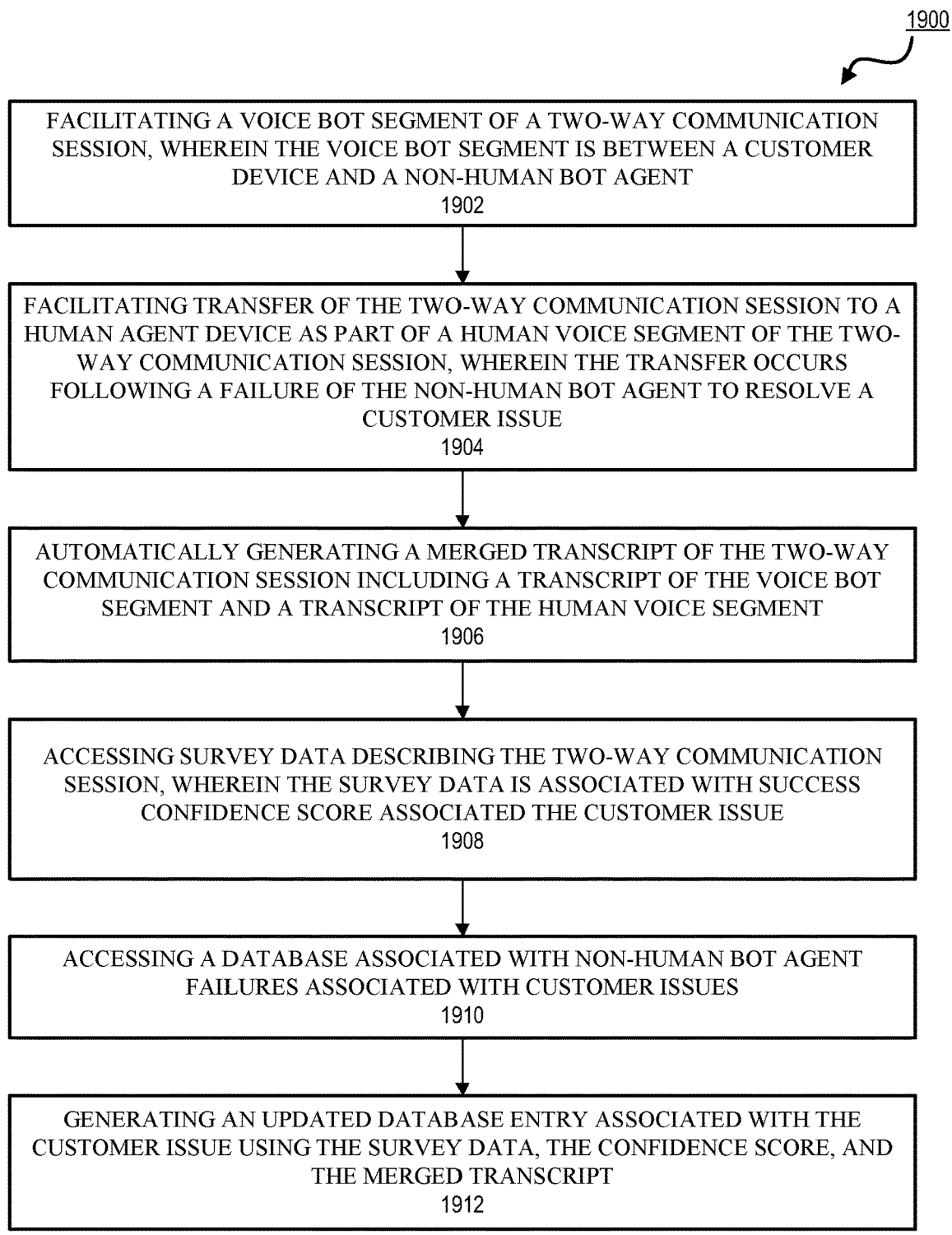
FIG. 19 is a flowchart illustrating another method in accordance with some aspects described herein.

FIG. 19 is a flowchart of a method 1900. Method 1900 may be implemented in any manner described above, including instructions in a storage medium, configuration for processors in a device, or any other such aspect.

Method 1900 includes block 1902, describing an operation for facilitating a voice bot segment of a two-way communication session, where the voice bot segment is between a customer device and a non-human bot agent. Block 1904 describes an operation for facilitating transfer of the two-way communication session to a human agent device as part of a human voice segment of the two-way communication session, where the transfer occurs following a failure of the non-human bot agent to resolve a customer issue. Block 1906 describes an operation for automatically generating a merged transcript of the two-way communication session including a transcript of the voice bot segment and a transcript of the human voice segment. Block 1908 describes an operation for accessing survey data describing the two-way communication session, where the survey data is associated with a confidence score (e.g., indicating a success confidence) associated with the customer issue. Block 1910 describes an operation for accessing a database associated with non-human bot agent failures associated with customer issues. Block 1912 describes an operation for generating an updated database entry associated with the customer issue using the survey data, the confidence score, and the merged transcript.

In addition, any of the methods above can include additional aspects, with the described method operating in accordance with any of the elements below. For example, in some aspects dynamically updating the non-human bot agent includes adding a menu prompt associated with the customer issue to a decision tree of the non-human bot agent and adding a response associated with the menu prompt to the non-human bot agent, where the response comprises the language data.

In other aspects, the failure of the non-human bot agent to resolve the customer issue is associated with a request from the customer device to communicate with the human agent device.

In still other aspects, the failure of the non-human bot agent to resolve the customer issue is associated with an end of a decision path of the non-human bot agent.

In some aspects of any of the methods above, the survey data comprises summary data generated by the human agent device following the customer device disconnecting from the two-way communication session.

Some implementations of any of the methods above may include the additional operations of gathering transcript data in real-time for two-way communication sessions managed by a communication system, where the two-way communication sessions are associated with the non-human bot agent and a pool of human agents and automatically identifying customer issues and successful resolutions of customer issues associated with one or more human agents of the pool of human agents.

Other implementations of any of the methods above may additionally or alternatively include the operations of tracking successful resolutions of customer issues in real-time for a plurality of two-way communication sessions involving human agent devices, dynamically updating the non-human bot agent in real-time using language data from the successful resolutions, tracking results from subsequent two-way communication sessions associated with the language data, and dynamically updating the non-human bot agent in real-time based on the results from the subsequent two-way communication sessions.

Some aspects of any of the methods above may operate where the two-way communication session begins in an initial language, and where the language data from the transcript associated with resolution of the customer issue comprises a cue indicating a preference for an alternate language other than the initial language. Systems supporting such an implementation can include or be able to route a communication to an agent (e.g., either human or automated) to support the language associated with the cue. In some implementations, supported languages can have cues that trigger a two-way communication to be rerouted, in addition to having cues for unsupported languages. In a system that identifies unsupported languages, a message can be provided in the unsupported language indicating that the language is not supported, and that further assistance can only be provided in a supported language. Such a system can list the available supported language using the terms from the unsupported language. Feedback and machine learning or AI systems can track instances of cues for unsupported language being triggered, and provide system feedback for thresholds associated with recommendations for adding support for an unsupported language based on feedback criteria (e.g., frequency of unsupported language cue triggers, customer purchase values associated with unsupported language cue triggers, weighted sentiment values associated with unsupported language cue triggers, etc.)

Specific details are given in the above description to provide a thorough understanding of the embodiments. However, it is understood that the embodiments can be practiced without these specific details. Some implementations can be practiced with repeating operations and intervening operations for any of the aspects above. Additionally, a system or device can operate hundreds or many thousands of instances of such methods simultaneously.

In various implementations, any number of operations of the methods above, or other operations can be performed simultaneously by a device or system implementing the aspects described herein. As described, a single system or communications device can perform thousands of such operations per second or more. In various devices, as a user interacts with a system, and the system analyzes the user inputs as feedback, the system can use such feedback for real-time dynamic adjustments to system operation, such that inputs from a user can be used as feedback to alter system operation while the user continues to interact with the system or device.

Further, as described above, any bot, voice bot, or bot system can be implemented as a generative artificial intelligence (AI) system. Such systems can include systems supported by large language models (LLM) trained from text. Such text can include feedback text generated as part of transcript merging systems described herein. In some aspects, such systems can be trained in real-time while the systems are being used to respond to user inputs. The generative AI system can generate language (e.g., voice or text) outputs in response to one user, while transcript data from another user is simultaneously being processed and used to update the language model the facilitates the generative AI system. Such generative AI systems can be used in place of or in combination with bot scripting systems as described herein which use fixed text scripts, rather than generative AI systems that generate responsive text from an LLM. Additionally, as described herein, a system can use multiple different generative AI systems with LLMs targeted for different contexts, such as user (e.g., client device) characteristics, two-way communication topic contexts, or other such communication specific context.

Additionally, not all details of every method are described. For example, circuits can be shown as block diagrams in order not to obscure the embodiments in unnecessary detail. In other instances, well-known circuits, processes, algorithms, structures, and techniques can be shown without unnecessary detail in order to avoid obscuring the embodiments. Additionally, some examples can operate with repeated or intervening operations, and multiple instances of operations can occur with dynamic adjustments made in response to real-time feedback to update data for bot operations.

Figure 20:
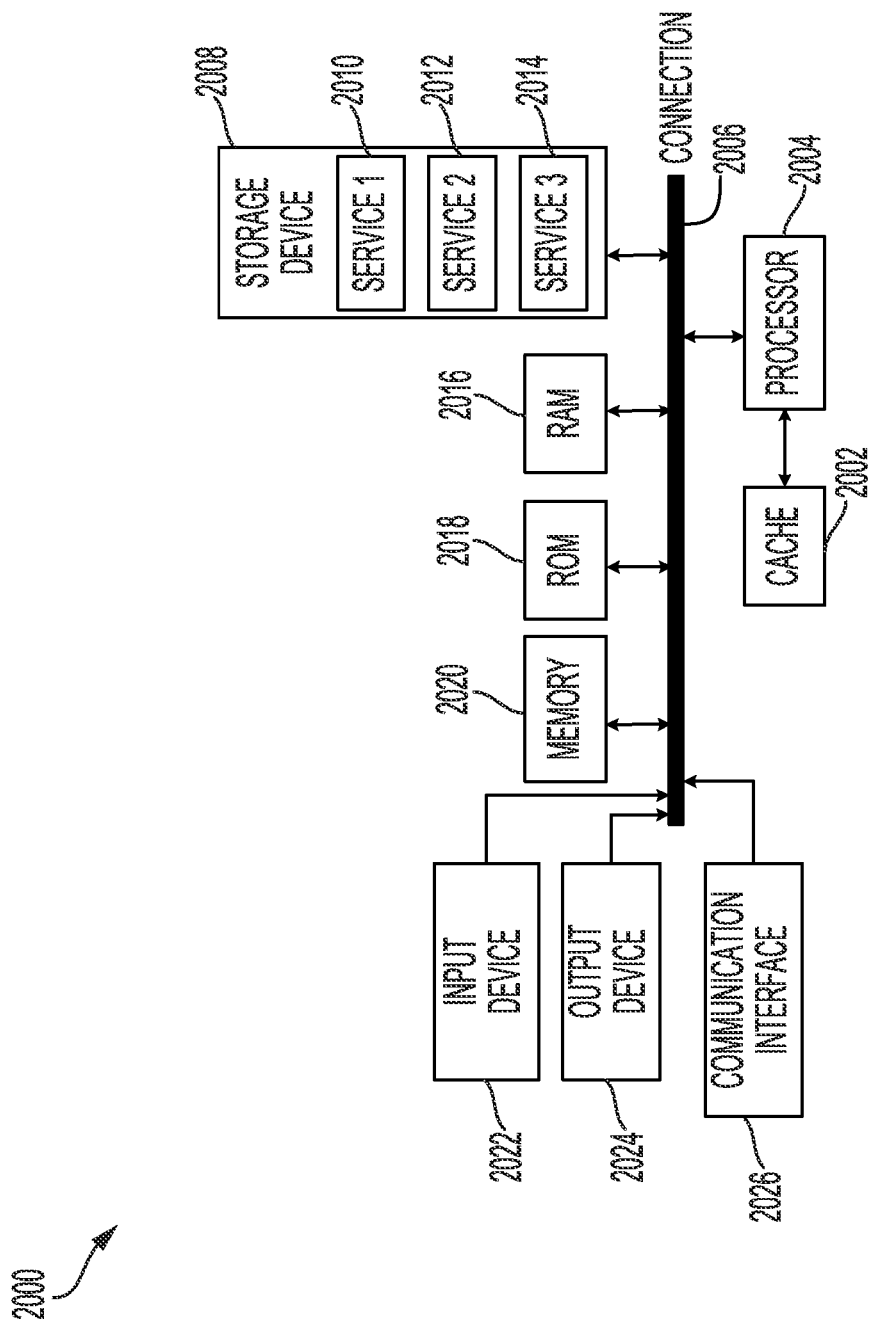
FIG. 20 is an example of a computing device that can be used to implement devices in a two-way communication system in accordance with examples described herein.

FIG. 20 illustrates a computing system architecture 2000 that can be used to implement devices described herein. The computing system architecture 2000 includes various components in electrical communication with each other using a connection 2006, such as a bus, in accordance with some implementations. Example system architecture 2000 includes a processing unit (CPU or processor) 2004 and a system connection 2006 that couples various system components including the system memory 2020, such as ROM 2018 and RAM 2016, to the processor 2004. The system architecture 2000 can include a cache 2002 of high-speed memory connected directly with, in close proximity to, or integrated as part of the processor 2004. The system architecture 2000 can copy data from the memory 2020 and/or the storage device 2008 to the cache 2002 for quick access by the processor 2004. In this way, the cache can provide a performance boost that avoids processor 2004 delays while waiting for data. These and other modules can control or be configured to control the processor 2004 to perform various actions.

Other system memory 2020 may be available for use as well. The memory 2020 can include multiple different types of memory with different performance characteristics. The processor 2004 can include any general purpose processor and a hardware or software service, such as service 1 2010, service 2 2012, and service 3 2014 stored in storage device 2008, configured to control the processor 2004 as well as a special-purpose processor where software instructions are incorporated into the actual processor design. The processor 2004 may be a completely self-contained computing system, containing multiple cores or processors, a bus, memory controller, cache, etc. A multi-core processor may be symmetric or asymmetric.

To enable user communication with the computing system architecture 2000, an input device 2022 can represent any number of input mechanisms, such as a microphone for speech, a touch-sensitive screen for gesture or graphical input, keyboard, mouse, motion input, speech and so forth. An output device 2024 can also be one or more of a number of output mechanisms known to those of skill in the art. In some instances, multimodal systems can enable a user to provide multiple types of input to communicate with the computing system architecture 2000. The communications interface 2026 can generally govern and control the user input and system output. There is no restriction on operating on any particular hardware arrangement and therefore the basic features here may easily be substituted for improved hardware or firmware arrangements as they are developed.

Storage device 2008 is a non-volatile memory and can be a hard disk or other types of computer readable media which can store data that are accessible by a computer, such as magnetic cassettes, flash memory cards, solid state memory devices, digital versatile disks, cartridges, RAMs 2016, ROM 2018, and hybrids thereof.

The storage device 2008 can include services 2010, 2012, 2014 for controlling the processor 2004. Other hardware or software modules are contemplated. The storage device 2008 can be connected to the system connection 2006. In one aspect, a hardware module that performs a particular function can include the software component stored in a computer-readable medium in connection with the necessary hardware components, such as the processor 2004, connection 2006, output device 2024, and so forth, to carry out the function.

This disclosure contemplates the computer system taking any suitable physical form. As example and not by way of limitation, the computer system may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computer system may include one or more computer systems, be unitary or distributed, span multiple locations, span multiple machines, and/or reside in a cloud, which may include one or more cloud components in one or more networks. Where appropriate, one or more computer systems may perform without substantial spatial or temporal limitation one or more steps of one or more methods described or illustrated herein. As an example and not by way of limitation, one or more computer systems may perform as events occur or in batch mode aggregating multiple events, such as over one or more steps of one or more methods described or illustrated herein. One or more computer systems may perform at different times or at different locations one or more steps of one or more methods described or illustrated herein, where appropriate.

The processor may be, for example, be a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory can be coupled to the processor by, for example, a bus. The memory can include, by way of example but not limitation, random access memory (RAM), such as dynamic RAM (DRAM) and static RAM (SRAM). The memory can be local, remote, or distributed.

The bus can also couple the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software can be stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory herein. Even when software is moved to the memory for execution, the processor can make use of hardware registers to store values associated with the software, and local cache that, ideally, serves to speed up execution. As used herein, a software program is assumed to be stored at any known or convenient location (from non-volatile storage to hardware registers), when the software program is referred to as "implemented in a computer-readable medium." A processor is considered to be "configured to execute a program" when at least one value associated with the program is stored in a register readable by the processor.

The bus can also couple the processor to the network interface device. The interface can include one or more of a modem or network interface. It will be appreciated that a modem or network interface can be considered to be part of the computer system. The interface can include an analog modem, Integrated Services Digital network (ISDNO modem, cable modem, token ring interface, satellite transmission interface (e.g., "direct PC"), or other interfaces for coupling a computer system to other computer systems. The interface can include one or more input and/or output (I/O) devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device.

In operation, the computer system can be controlled by operating system software that includes a file routing system, such as a disk operating system. One example of operating system software with associated file routing system software is the family of operating systems known as Windows® from Microsoft Corporation of Redmond, WA, and their associated file routing systems. Another example of operating system software with its associated file routing system software is the Linux™ operating system and its associated file routing system. The file routing system can be stored in the non-volatile memory and/or drive unit and can cause the processor to execute the various acts involved by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art.

An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless ally stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some examples. The involved structure for a variety of these systems will appear from the description below. In addition, the techniques are not described with reference to any particular programming language, and various examples may thus be implemented using a variety of programming languages.

In various implementations, the system operates as a standalone device or may be connected (e.g., networked) to other systems. In a networked deployment, the system may operate in the capacity of a server or a client system in a client-server network environment, or as a peer system in a peer-to-peer (or distributed) network environment.

A storage medium typically may be non-transitory or include a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting the subject matter to the precise forms disclosed. Persons skilled in the relevant art can appreciate that many modifications and variations are possible in light of the above disclosure. Numerous details are described to provide a thorough understanding of the disclosure. However, in certain instances, well-known or conventional details are not described in order to avoid obscuring the description.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any numbers noted herein are only examples: alternative implementations may employ differing values or ranges.

While certain aspects of the disclosure are presented below in certain claim forms, the inventors contemplate the various aspects of the disclosure in any number of claim forms. Any claims intended to be treated under 35 U.S.C. § 152(f) will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term. the scope and meaning of a term is the same, in the same context, whether or not it is highlighted. It will be appreciated that the same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Any of the steps, operations, or processes described herein may be performed or implemented with one or more hardware or software modules, alone or in combination with other devices. In some examples, a software module is implemented with a computer program object including a computer-readable medium containing computer program code, which can be executed by a computer processor for performing any or all of the steps, operations, or processes described.

Examples may also relate to an apparatus for performing the operations herein. This apparatus may be specially constructed for the involved purposes, and/or it may include a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples may also relate to an object that is produced by a computing process described herein. Such an object may include information resulting from a computing process, where the information is stored on a non-transitory, tangible computer readable storage medium and may include any implementation of a computer program object or other data combination described herein.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

The various examples discussed above may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments). A processor(s), implemented in an integrated circuit, may perform the necessary tasks.

The program code may be executed by a processor, which may include one or more processors, such as one or more digital signal processors (DSPs), general purpose microprocessors, an application integrated circuits (ASICs), field programmable logic arrays (FPGAs), or other equivalent integrated or discrete logic circuitry. Such a processor may be configured to perform any of the techniques described in this disclosure. A general purpose processor may be a microprocessor. but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for implementing a suspended database update system.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The foregoing detailed description of the technology has been presented for purposes of illustration and description. It is not intended to be exhaustive or to limit the technology to the precise form disclosed. Many modifications and variations are possible in light of the above teaching. The described examples were chosen in order to best explain the principles of the technology, its practical application, and to enable others skilled in the art to utilize the technology in various examples and with various modifications as are suited to the particular use contemplated. It is intended that the scope of the technology be defined by the claim.

What is claimed is:

1. A computer-implemented method comprising:
   facilitating a voice bot segment of a two-way communication session, wherein the voice bot segment is between a customer device and a non-human bot agent;
   facilitating transfer of the two-way communication session to a human agent device as part of a human voice segment of the two-way communication session, wherein the transfer occurs following a failure of the non-human bot agent to resolve a customer issue;
   accessing survey data describing the two-way communication session, wherein the survey data includes post call data from the customer device including an evaluation of the human voice segment;
   automatically generating a merged transcript in real-time as the voice bot segment and the human voice segment occur, wherein the segments are automatically and separately routed to generate the merged transcript, and wherein the merged transcript includes a transcript of the voice bot segment, a transcript of the human voice segment, and the survey data;
   automatically processing the merged transcript associated with the two-way communication session to identify language data associated with resolution of the customer issue; and
   dynamically updating the non-human bot agent using the language data.

2. The computer-implemented method of claim 1, wherein dynamically updating the non-human bot agent includes:
   adding a menu prompt associated with the customer issue to a decision tree of the non-human bot agent; and
   adding a response associated with the menu prompt to the non-human bot agent, wherein the response includes the language data.

3. The computer-implemented method of claim 1, wherein the failure of the non-human bot agent to resolve the customer issue is associated with a request from the customer device to communicate with the human agent device.

4. The computer-implemented method of claim 1, wherein the failure of the non-human bot agent to resolve the customer issue is associated with an end of a decision path of the non-human bot agent.

5. The computer-implemented method of claim 1, wherein the survey data includes summary data generated by the human agent device following the customer device disconnecting from the two-way communication session.

6. The computer-implemented method of claim 1, further comprising:
   gathering the transcript data in real-time for two-way communication sessions managed by a communication system, wherein the two-way communication sessions are associated with the non-human bot agent and a pool of human agents; and
   automatically identifying customer issues and successful resolutions of customer issues associated with one or more human agents of the pool of human agents.

7. The computer-implemented method of claim 1, further comprising:
   tracking successful resolutions of customer issues in real-time for a plurality of two-way communication sessions involving human agent devices;
   dynamically updating the non-human bot agent in real-time using language data from the successful resolutions;
   tracking results from subsequent two-way communication sessions associated with the language data; and
   dynamically updating the non-human bot agent in real-time based on the results from the subsequent two-way communication sessions.

8. The computer-implemented method of claim 1, wherein the two-way communication session begins in an initial language; and
   wherein the language data from the transcript associated with resolution of the customer issue includes a cue indicating a preference for an alternate language other than the initial language.

9. The computer-implemented method of claim 1, wherein automatically generating a merged transcript includes receiving the transcript of the voice bot segment, the transcript of the human voice segment, and the survey data from separate independent systems using separate transcript generation tools and formats.

10. The computer-implemented method of claim 1, wherein automatically generating the merged transcript further includes:
    selecting a format using an application layer; and
    formatting the merged transcript using a presentation layer.

11. The computer-implemented method of claim 1, wherein the voice bot segment includes transitions between multiple separate bot systems.

12. The computer-implemented method of claim 1, wherein the human voice segment includes transitions between multiple human agents, and wherein the survey data includes feedback data from multiple feedback systems.

13. The computer-implemented method of claim 1, further comprising:
    displaying the merged transcript in a user interface; and
    receiving an update to the merged transcript through the user interface.

14. A system comprising:
    memory; and
    one or more processors coupled to the memory, the one or more processors configured for operations including:

facilitating a voice bot segment of a two-way communication session, wherein the voice bot segment is between a customer device and a non-human bot agent;

facilitating transfer of the two-way communication session to a human agent device as part of a human voice segment of the two-way communication session, wherein the transfer occurs following a failure of the non-human bot agent to resolve a customer issue;

accessing survey data describing the two-way communication session, wherein the survey data includes post call data from the customer device including an evaluation of the human voice segment;

automatically generating a merged transcript in real-time as the voice bot segment and the human voice segment occur, wherein the segments are automatically and separately routed to generate the merged transcript, and wherein the merged transcript includes a transcript of the voice bot segment, a transcript of the human voice segment, and the survey data;

automatically processing the merged transcript associated with the two-way communication session to identify language data associated with resolution of the customer issue; and dynamically updating the non-human bot agent using the language data.

15. The system of claim 14, wherein dynamically updating the non-human bot agent includes:

adding a menu prompt associated with the customer issue to a decision tree of the non-human bot agent; and adding a response associated with the menu prompt to the non-human bot agent, wherein the response includes the language data.

16. The system of claim 14, wherein the failure of the non-human bot agent to resolve the customer issue is associated with a request from the customer device to communicate with the human agent device.

17. The system of claim 14, wherein the failure of the non-human bot agent to resolve the customer issue is associated with an end of a decision path of the non-human bot agent.

18. The system of claim 14, wherein the two-way communication session begins in an initial language; and wherein the language data from the transcript associated with resolution of the customer issue includes a cue indicating a preference for an alternate language other than the initial language.

19. A non-transitory computer readable medium comprising instructions that, when executed by one or more processors of a system, cause the system to perform operations including:

facilitating a voice bot segment of a two-way communication session, wherein the voice bot segment is between a customer device and a non-human bot agent;

facilitating transfer of the two-way communication session to a human agent device as part of a human voice segment of the two-way communication session, wherein the transfer occurs following a failure of the non-human bot agent to resolve a customer issue;

accessing survey data describing the two-way communication session, wherein the survey data includes post call data from the customer device including an evaluation of the human voice segment;

automatically generating a merged transcript in real-time as the voice bot segment and the human voice segment occur, wherein the segments are automatically and separately routed to generate the merged transcript, and wherein the merged transcript includes a transcript of the voice bot segment, a transcript of the human voice segment, and the survey data;

automatically processing the merged transcript associated with the two-way communication session to identify language data associated with resolution of the customer issue; and dynamically updating the non-human bot agent using the language data.

20. The non-transitory computer readable medium of claim 19, wherein dynamically updating the non-human bot agent includes:

adding a menu prompt associated with the customer issue to a decision tree of the non-human bot agent; and adding a response associated with the menu prompt to the non-human bot agent, wherein the response includes the language data.

21. The non-transitory computer readable medium of claim 19, wherein the failure of the non-human bot agent to resolve the customer issue is associated with a request from the customer device to communicate with the human agent device.

22. The non-transitory computer readable medium of claim 19, wherein the failure of the non-human bot agent to resolve the customer issue is associated with an end of a decision path of the non-human bot agent.

23. The non-transitory computer readable medium of claim 19, wherein the survey data includes summary data generated by the human agent device following the customer device disconnecting from the two-way communication session.

24. The non-transitory computer readable medium of claim 19, wherein the two-way communication session begins in an initial language; and wherein the language data from the transcript associated with resolution of the customer issue includes a cue indicating a preference for an alternate language other than the initial language.

* * * * *